(12) United States Patent
Boufahja et al.

(10) Patent No.: US 12,488,883 B2
(45) Date of Patent: Dec. 2, 2025

(54) SYSTEMS AND METHODS FOR CONFORMANCE TESTING OF A FAST HEALTHCARE INTEROPERABILITY RESOURCES (FHIR) SERVER

(71) Applicant: GE Precision Healthcare LLC, Waukesha, WI (US)

(72) Inventors: Abderrazek Boufahja, Illkirch-Graffenstaden (FR); Hervé Hoehn, Antony (FR)

(73) Assignee: GE Precision Healthcare LLC, Waukesha, WI (US)

( * ) Notice: Subject to any disclaimer, the term of this patent is extended or adjusted under 35 U.S.C. 154(b) by 73 days.

(21) Appl. No.: 18/415,242

(22) Filed: Jan. 17, 2024

(65) Prior Publication Data

US 2025/0232867 A1    Jul. 17, 2025

(51) Int. Cl.
G16H 40/20 (2018.01)
G06F 11/3668 (2025.01)

(52) U.S. Cl.
CPC ......... *G16H 40/20* (2018.01); *G06F 11/3684* (2013.01)

(58) Field of Classification Search
CPC ............................ G16H 40/20; G06F 11/3684
See application file for complete search history.

(56) References Cited

U.S. PATENT DOCUMENTS

| | | |
|---|---|---|
| 5,754,755 A | 5/1998 | Smith, Jr. |
| 7,624,380 B2 | 11/2009 | Okada |
| 8,365,147 B2 | 1/2013 | Grechanik et al. |
| 9,021,440 B1 | 4/2015 | Chandrasekaran |
| 9,038,026 B2 | 5/2015 | Chandra et al. |
| 9,053,237 B2 | 6/2015 | Channamsetti et al. |

(Continued)

FOREIGN PATENT DOCUMENTS

| | | |
|---|---|---|
| CN | 103365777 A | 10/2013 |
| CN | 109117369 A | 1/2019 |

(Continued)

OTHER PUBLICATIONS

T. Pope, A. Patooghy and A. Sarrafzadeh, "On the Trustworthiness of FHIR-Based Internet-of-Things Digital Health Systems," 2023 IEEE 66th International Midwest Symposium on Circuits and Systems (MWSCAS), Tempe, AZ, USA, 2023, pp. 279-283, doi: 10.1109/MWSCAS57524.2023.10406028. (Year: 2023).*

(Continued)

*Primary Examiner* — Sun M Li
(74) *Attorney, Agent, or Firm* — SPQ IP LLC

(57) ABSTRACT

A system and method are provided for conformance testing of a Fast Healthcare Interoperability Resources (FHIR) server. Information related to the FHIR standard may be received. A test script including a query for a resource stored by the FHIR server using a search value of a search parameter of the resource and using a search variation of a type of the search parameter may be generated and executed. A capability statement for the FHIR server may be generated. A declared capability statement of the FHIR server may be validated based on the generated capability statement. Information related to a validation result of the declared capability statement may be provided for display.

19 Claims, 10 Drawing Sheets

(56) References Cited

U.S. PATENT DOCUMENTS

| | | | |
|---|---|---|---|
| 9,152,542 B2 | 10/2015 | Navalur | |
| 10,509,718 B2 | 12/2019 | Venkatasubramanian et al. | |
| 11,030,081 B2 | 6/2021 | Englehart et al. | |
| 2016/0301732 A1* | 10/2016 | Moretto | H04L 43/50 |
| 2019/0172590 A1* | 6/2019 | Vesto | G16H 50/50 |
| 2020/0379885 A1* | 12/2020 | Englehart | G06F 11/3684 |
| 2020/0395104 A1* | 12/2020 | Raul | H04L 67/303 |
| 2022/0245270 A1* | 8/2022 | De Araujo | G16H 40/67 |
| 2025/0095809 A1* | 3/2025 | Wu | G16H 40/20 |

FOREIGN PATENT DOCUMENTS

| | | |
|---|---|---|
| CN | 115587045 A | 1/2023 |
| CN | 115757185 A | 3/2023 |

OTHER PUBLICATIONS

Rosenau L, Majeed RW, Ingenerf J, Kiel A, Kroll B, Kohler T, Prokosch HU, Gruendner J. Generation of a Fast Healthcare Interoperability Resources (FHIR)-based Ontology for Federated Feasibility Queries in the Context of COVID-19: Feasibility Study. JMIR Med Inform. Apr. 27, 2022; 10(4):e35789. (Year: 2022).*

Amit Walinjkar, John Woods, "FHIR Tools for Healthcare Interoperability". Faculty of Computer Science and Electronics Engineering, University of Essex, Colchester, Essex, UK. Received: Sep. 25, 2018; Published: Oct. 10, 2018. (Year: 2018).*

Walonoski J, Scanlon R, Dowling C, Hyland M, Ettema R, Posnack S. Validation and Testing of Fast Healthcare Interoperability Resources Standards Compliance: Data Analysis. JMIR Med Inform. Oct. 23, 2018;6(4):e10870. doi: 10.2196/10870. PMID: 30355549; PMCID: PMC6231749. (Year: 2018).*

Salman, Test Case Generation from Specifications Using Natural Language Processing, paper, Aug. 10, 2020, pp. 1-66, Sweden.

Walonoski et al., Validation and Testing of Fast Healthcare Interoperability Resources Standards Compliance: Data Analysis, paper, Oct. 23, 2018, JMIR Med Inform 2018, vol. 6, iss. 4, pp. 1-10, US.

Walinjakar et al., FHIR Tools for Healthcare Interoperability, paper, Oct. 10, 2018, Biomedical Journal of Scientific & Technical Research, Oct. 10, 2018, UK.

Touchstone, webpage accessible at https://touchstone.aegis.net/touchstone/, accessed Jan. 8, 2024.

Crucible, webpage accessible at https://projectcrucible.org/, accessed Jan. 8, 2024.

Inferno, webpage accessible at https://inferno.healthit.gov, accessed Jan. 8, 2024.

* cited by examiner

SYSTEMS AND METHODS FOR CONFORMANCE TESTING OF A FAST HEALTHCARE INTEROPERABILITY RESOURCES (FHIR) SERVER

TECHNICAL FIELD

The present disclosure relates, generally, to systems and methods for conformance testing of a FHIR server. More specifically, the present disclosure relates to systems and methods for validating the search functionality of a FHIR server as declared in a capability statement by determining the resources for which search is supported by the FHIR server, the search parameters for which search is supported by the FHIR server, and the variations of the types of search parameters for which search is supported by the FHIR server.

BACKGROUND

The FHIR standard defines a set of rules and specifications for electronically exchanging electronic health care data. The FHIR standard defines a set of resources that can be exchanged between FHIR servers and FHIR client devices. A FHIR client device may query a FHIR server for a resource using a search value of a search parameter of the resource. The FHIR server may return a resource, or a set of resources, based on the query.

A FHIR server may declare a capability statement that, among other things, identifies the resources for which search is supported by the FHIR server, the search parameters for which search is supported by the FHIR server, and the variations of the types of search parameters for which search is supported by the FHIR server. The capability statement may be used during conformance testing of the FHIR server.

FHIR® is a registered trademark owned by Health Level Seven International, Inc.

SUMMARY

This summary introduces concepts that are described in more detail in the detailed description. It should not be used to identify essential features of the claimed subject matter, nor to limit the scope of the claimed subject matter.

In an aspect, a method for conformance testing of a Fast Healthcare Interoperability Resources (FHIR) server comprises: receiving information related to a FHIR standard; generating a test script, including a query for a resource stored by the FHIR server using a search value of a search parameter of the resource and using a search variation of a type of the search parameter, based on the information related to the FHIR standard; executing the test script in association with the FHIR server; generating a capability statement for the FHIR server based on executing the test script; and validating a declared capability statement of the FHIR server based on the generated capability statement and the declared capability statement In another aspect, a method for conformance testing of a Fast Healthcare Interoperability Resources (FHIR) server comprises: generating a test script, including a query for a resource stored by the FHIR server using a search value of a search parameter of the resource and using a search variation of a type of the search parameter; executing the test script in association with the FHIR server; generating a capability statement for the FHIR server based on executing the test script; and validating a declared capability statement of the FHIR server based on the generated capability statement and the declared capability statement.

In yet another aspect, a device may include a memory configured to store instructions; and one or more processors configured to execute the instructions to: generate a query for a resource stored by a FHIR server using a search value of a search parameter of the resource and using a search variation of a type of the search parameter; transmit the query to the FHIR server; generate a capability statement for the FHIR server based on a response from the FHIR server to the query; and validate a declared capability statement of the FHIR server based on the generated capability statement and the declared capability statement.

DETAILED DESCRIPTION

FHIR defines greater than one hundred and fifty resources, such as "patient," "practitioner," "organization," "observation," etc. Each of the resources is associated with various search parameters. For example, the "patient" resource is associated with search parameters such as "address," "birthdate," "email," "general-practitioner," etc. Each search parameter is associated with a particular type, such as "token," "string," date," "quantity," etc. Each particular type of search parameter is associated with various search variations. For example, the "date" type is associated with search variations such as "equals," "not equal," "greater than," "less than," etc. In light of the foregoing, a large number of potential queries exist for querying a FHIR server for a resource. Conformance testing of a FHIR server may be inefficient, error-prone, or impossible due to the large number of potential queries.

Some embodiments herein provide a conformance testing platform that may validate the search functionality of a FHIR server as declared in a capability statement by determining the resources for which search is supported by the FHIR server, the search parameters for which search is supported by the FHIR server, and the variations of the types of search parameters for which search is supported by the FHIR server. The conformance testing platform may do so by generating test scripts including queries for resources stored by the FHIR server using search values of search parameters of the resources and using search variations of the types of the search parameters. In this way, some embodiments herein provide an improvement to FHIR conformance testing by more efficiently, more accurately, and more comprehensively testing and validating the search functionality of a FHIR server.

Figure 1:
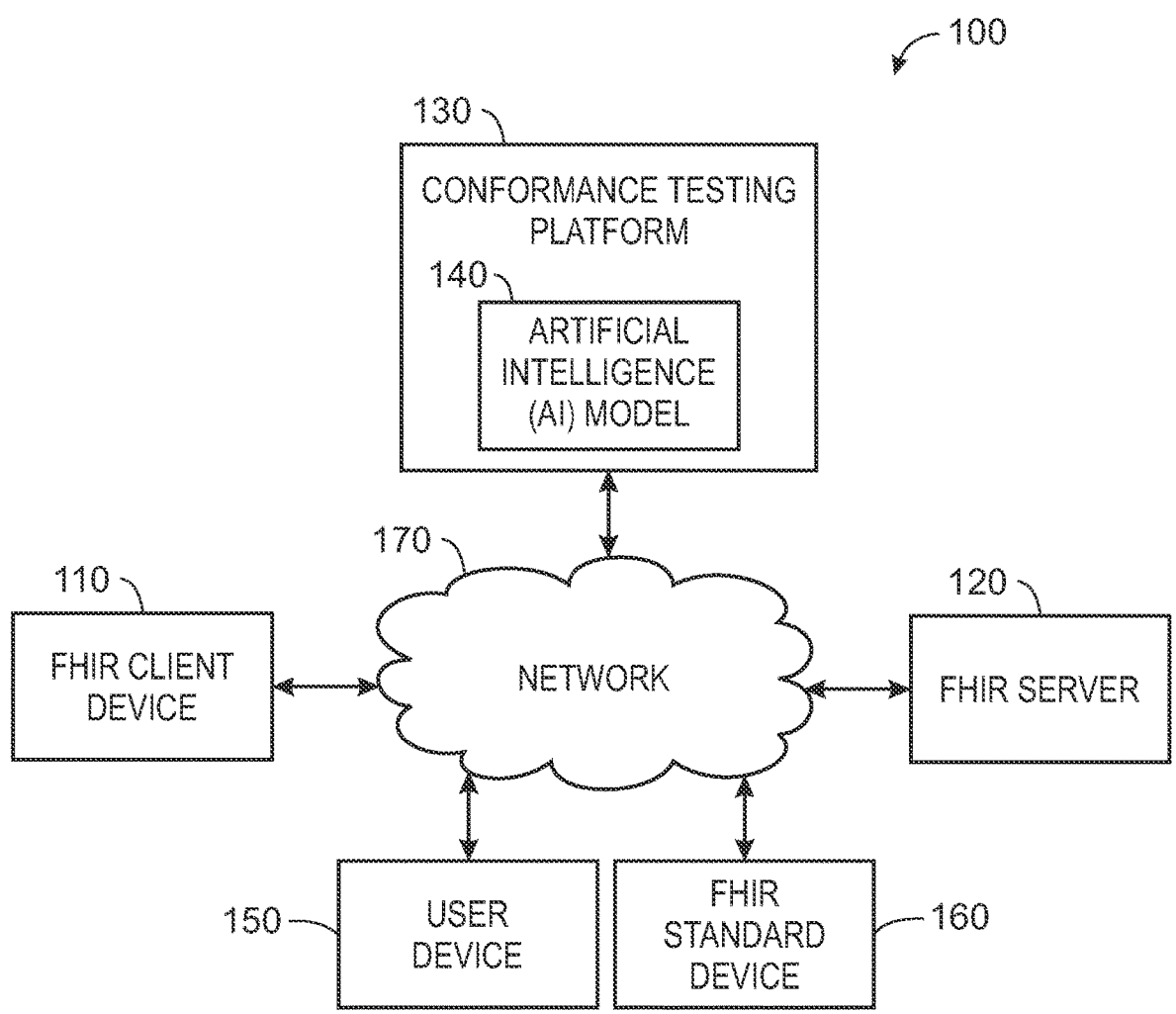
FIG. 1 is a diagram of an example system for conformance testing of a FHIR server.

FIG. 1 is a diagram of an example system 100 for conformance testing of a FHIR server. As shown in FIG. 1, the system 100 may include a FHIR client device 110, a FHIR server 120, a conformance testing platform 130, an AI model 140, a user device 150, a FHIR standard device 160, and a network 170.

The FHIR client device 110 may be configured to query the FHIR server 120 for a resource. For example, the FHIR client device 110 may be a smartphone, a laptop computer, a desktop computer, a wearable device, a medical device, a radiology device, or the like.

The FHIR server 120 may be configured to return a resource based on the query from the FHIR client device 110. For example, the FHIR server 120 may be a cloud server, an on-premises server, or the like.

The conformance testing platform 130 may be configured to receive information related to the FHIR standard, generate a test script based on the information related to the FHIR standard, execute the test script in association with the FHIR server 120, generate a capability statement of the FHIR server 120 based on executing the test script, validating a declared capability statement of the FHIR server based on the generated capability statement and the declared capability statement, and provide information related to a validation result of the declared capability statement for display based on validating the declared capability statement.

The AI model 140. For example, the AI model 140 may be a deep neural network (DNN), a convolutional neural networks (CNN), a fully convolutional network (FCN), a recurrent neural network (RCN), a Bayesian network, a graphical probabilistic model, a K-nearest neighbor classifier, a decision forests, a maximum margin method, or the like.

The user device 150 may be configured to display information related to a validation result of the declared capability statement. For example, the user device 150 may be a smartphone, a laptop computer, a desktop computer, a wearable device, or the like.

The FHIR standard device 160 may be configured to store information associated with the FHIR standard. For example, the FHIR standard device 160 may be a server, a database, or the like.

The network 170 may be configured to permit communication between the FHIR client device 10, the FHIR server 120, the conformance testing platform 130, the AI model 140, the user device 150, and/or the FHIR standard device 160. For example, the network 170 may be a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of the devices of the system 100 shown in FIG. 1 are provided as an example. In practice, the system 100 may include additional devices, fewer devices, different devices, or differently arranged devices than those shown in FIG. 1. Additionally, or alternatively, a set of devices (e.g., one or more devices) of the system 100 may perform one or more functions described as being performed by another set of devices of the system 100.

Figure 2:
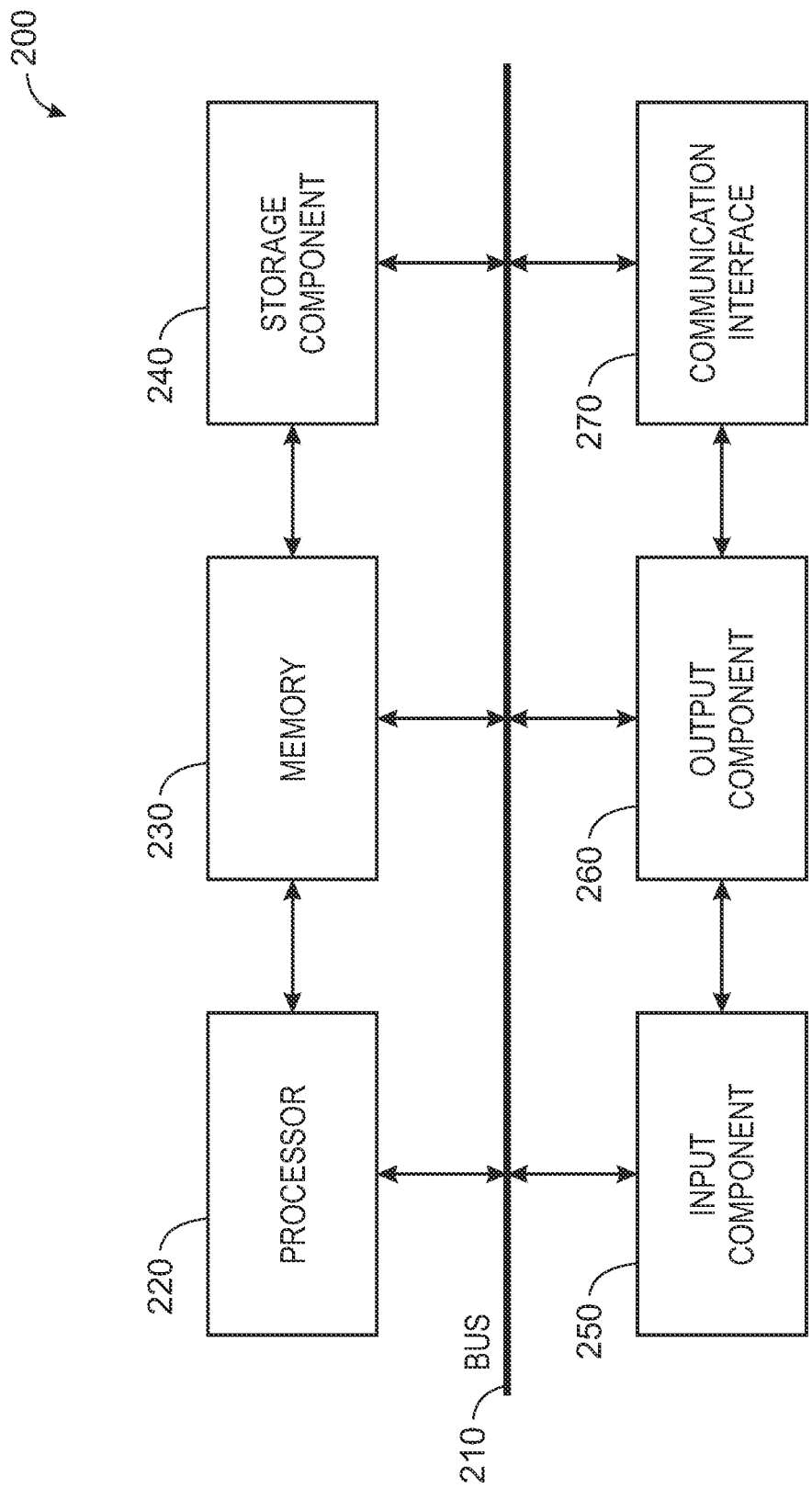
FIG. 2 is a diagram of example components of a device of FIG. 1.

FIG. 2 is a diagram of example components of a device 200 of FIG. 1. The device 200 may correspond to the FHIR client device 110, the FHIR server 120, the conformance testing platform 130, the user device 150, and/or the FHIR standard device 160. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 may be implemented in hardware, firmware, or a combination of hardware and software. The processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component.

The processor 220 may include one or more processors capable of being programmed to perform a function. The memory 230 may include a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 may store information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 may include a component that permits the device 200 to receive information, such as via user input (e.g., a touch screen display, a keyboard, a keypad, a mouse, a button, a switch, a camera, and/or a microphone). Additionally, or alternatively, the input component 250 may include a sensor for sensing information (e.g., a global positioning system (GPS) component, an accelerometer, a gyroscope, and/or an actuator). The output component 260 may include a component that provides output information from the device 200 (e.g., a display, a speaker for outputting sound at the output sound level, and/or one or more light-emitting diodes (LEDs)).

The communication interface 270 may include a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes based on the processor 220 executing software instructions stored by a non-transitory computer-readable medium, such as the memory 230 and/or the storage component 240. A computer-readable medium may be defined herein as a non-transitory memory device. A memory device may include memory space within a single physical storage device or memory space spread across multiple physical storage devices.

The software instructions may be read into the memory 230 and/or the storage component 240 from another computer-readable medium or from another device via the communication interface 270. When executed, the software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of the components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
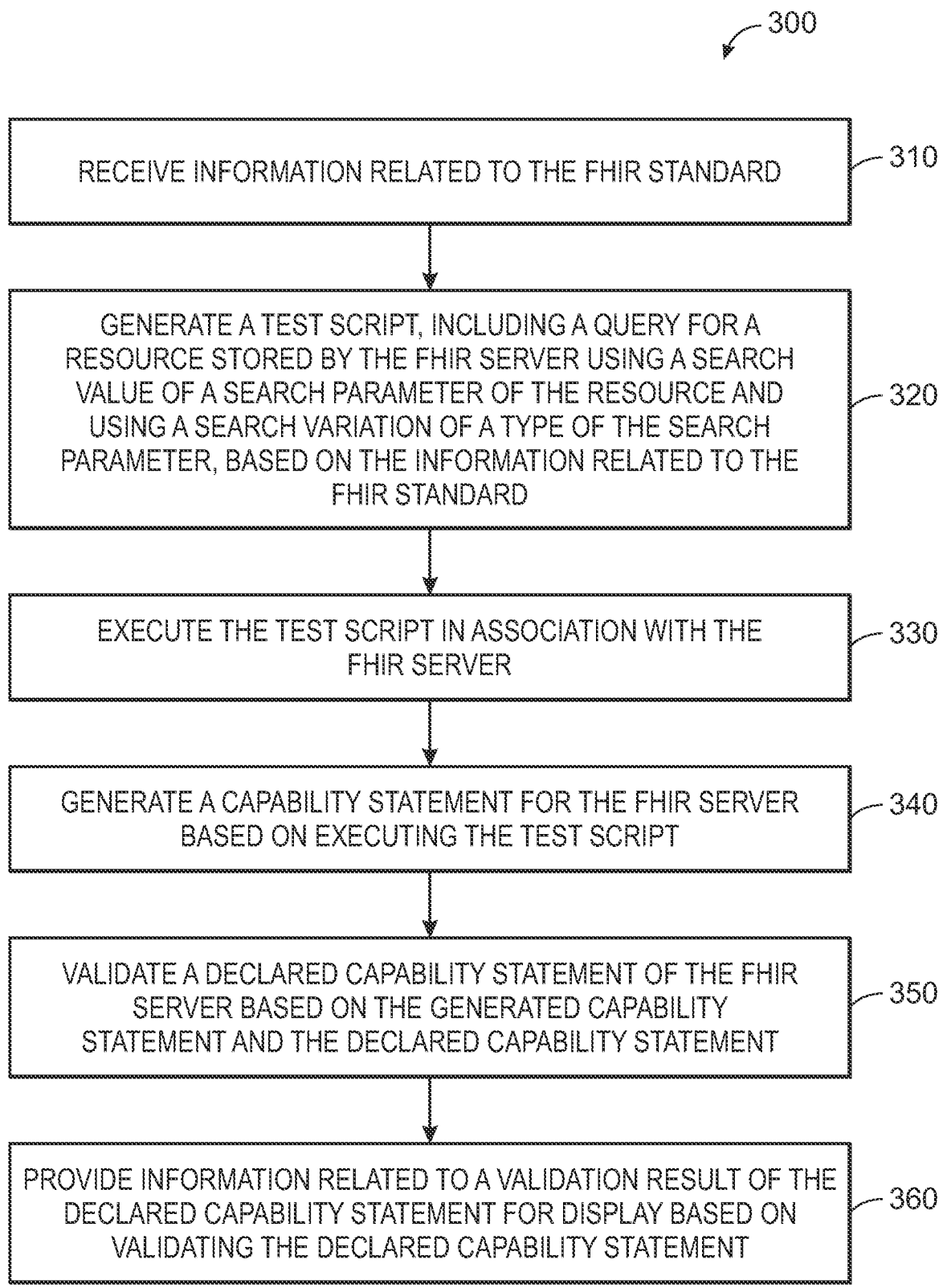
FIG. 3 is a flowchart of an example process for conformance testing of a FHIR server.

FIG. 3 is a flowchart of an example process 300 for conformance testing of a FHIR server. The conformance testing platform 130 may be configured to perform the operations of the process 300.

As shown in FIG. 3, the process 300 may include receiving information related to the FHIR standard (operation 310). The information related to the FHIR standard may be resource definitions, search parameter definitions, resource samples, or the like. According to an embodiment, the information related to the FHIR standard may be associated with a particular format, such as JavaScript object notation (JSON), extensible markup language (XML), or the like.

According to an embodiment, the conformance testing platform 130 may receive the information related to the FHIR standard from the FHIR standard device 160. For example, the conformance testing platform 130 may request the information related to the FHIR standard from the FHIR standard device 160, and receive the information related to the FHIR standard based on the request. According to an embodiment, the conformance testing platform 130 may request the information related to the FHIR standard based on a request from the user device 150. Alternatively, the conformance testing platform 130 may request the information related to the FHIR standard based on a predetermined interval (e.g., weekly, monthly, etc.). Alternatively, the conformance testing platform 130 may request the information related to the FHIR standard based on determining a change in the information related to the FHIR standard.

According to an embodiment, the conformance testing platform 130 may analyze the information related to the FHIR standard, determine a resource for which to generate a query, determine a search parameter for the resource for which to generate the query, and determine a search variation of a type of the search parameter for which to generate the query. For example, the conformance testing platform 130 may analyze the information related to the FHIR standard to determine the resources defined by the FHIR standard, to determine the search parameters of the resources, and to determine the search variations of the various types of search parameters.

As further shown in FIG. 3, the process 300 may include generating a test script, including a query for a resource stored by the FHIR server using a search value of a search parameter of the resource and using a search variation of a type of the search parameter, based on the information related to the FHIR standard (operation 320).

According to an embodiment, the conformance testing platform 130 may extract a list of FHIR resource types based on the information related to the FHIR standard, and generate a list of resource types. For each resource type, the conformance testing platform 130 may extract related search parameters based on the selected resource type and the information related to the FHIR standard, and generate a list of search parameters. For a resource type and a search parameter, the conformance testing platform 130 may identify a type of the search parameter based on the resource type, search parameter, and the information related to the FHIR standard. The conformance testing platform 130 may identify variations of the type of the search parameter.

According to an embodiment, the conformance testing platform 130 may extract a path of the search parameter based on the type of the search parameter and the information related to the FHIR standard, for the related resource type. The conformance testing platform 130 may identify a test script template based on a variation of the type of the search parameter, the path of the search parameter, and a repository of test script templates. The conformance testing platform 130 may generate a test script based on the resource type, the search parameter, the path of the search parameter and the test script template.

According to an embodiment, the test script may test whether a search for a resource is supported by the FHIR server 120, whether a search for the resource using a search parameter of the resource is supported by the FHIR server 120, and/or whether a search using a search variation of a type of the search parameter is supported by the FHIR server 120.

According to an embodiment, the test script may include a query and an assertion. The query may be for a resource stored by the FHIR server 120. The assertion may identify an expected response of the FHIR server 120 with respect to the query, and may be used to validate a capability statement of the FHIR server 120.

Figure 4:
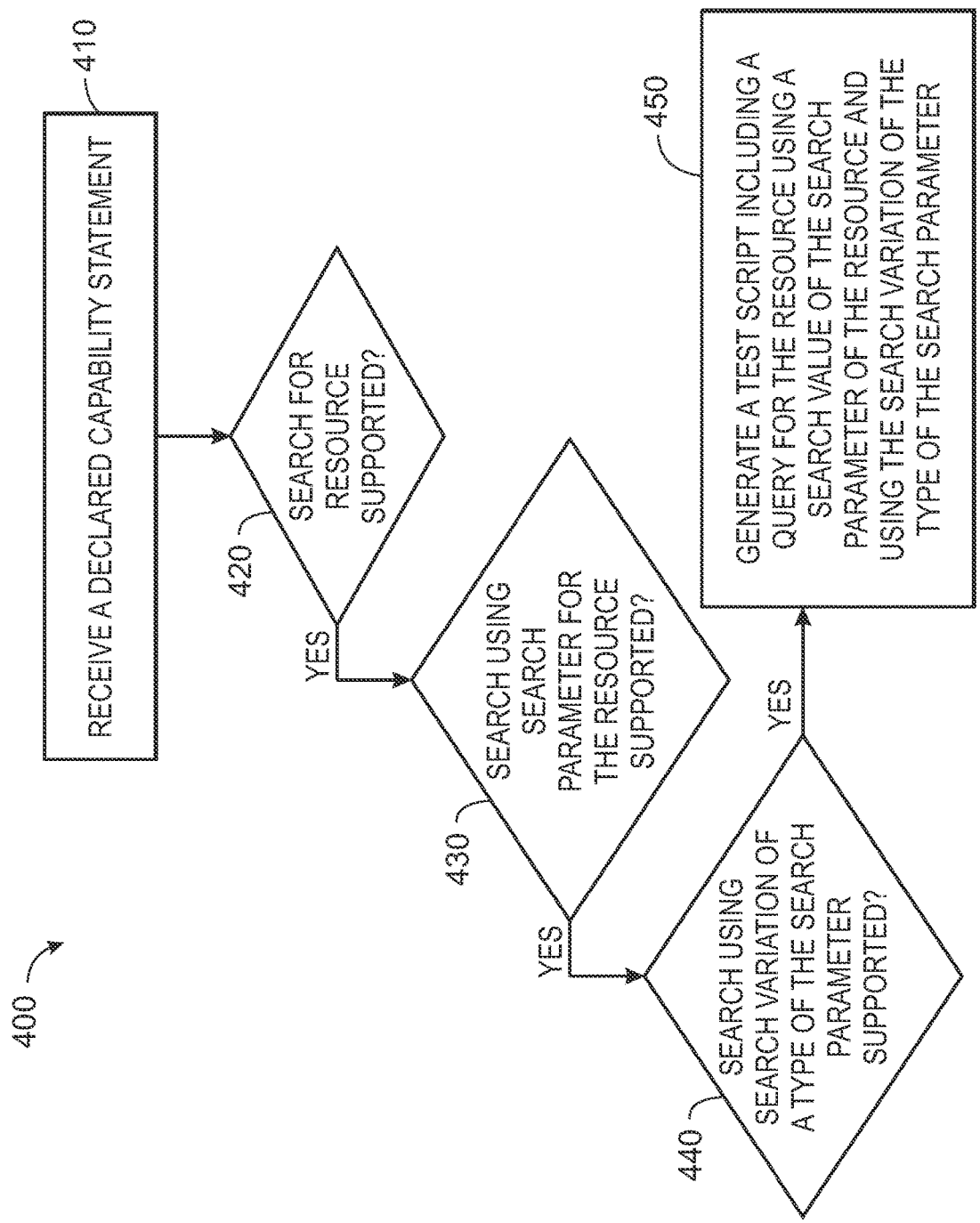
FIG. 4 is a flowchart of an example process for determining a resource, a search parameter of the resource, and a search variation of a type of the search parameter for which to generate a query based on a declared capability statement of a FHIR server.
Figure 5:
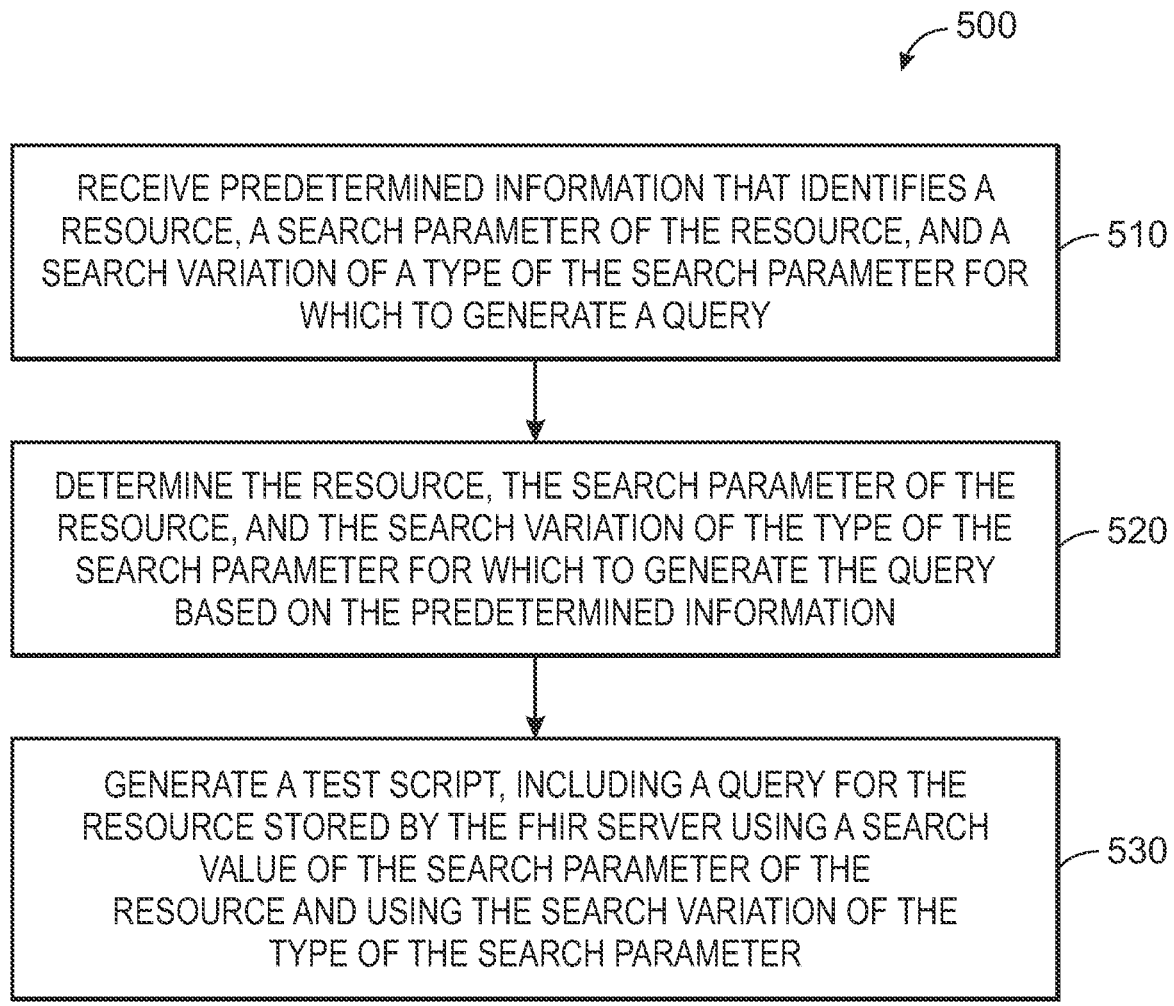
FIG. 5 is a flowchart of an example process for determining a resource, a search parameter of the resource, and a search variation of a type of the search parameter for which to generate a query based on predetermined information.

According to an embodiment, the conformance testing platform 130 may determine a resource, a search parameter of the resource, and a search variation of a type of the search parameter for which to generate a query. For example, the conformance testing platform 130 may determine a resource, a search parameter of the resource, and a search variation of a type of the search parameter for which to generate a query based on a declared capability statement of the FHIR server 120 as shown in FIG. 4, based on predetermined information as shown in FIG. 5, or the like.

According to an embodiment, the conformance testing platform 130 may determine a resource, a search parameter of the resource, and a search variation of a type of the search parameter for which to generate a query based on a declared capability statement of the FHIR server 120. For example, FIG. 4 is a flowchart of an example process 400 for determining a resource, a search parameter of the resource, and a search variation of a type of the search parameter for which to generate a query based on a declared capability statement of a FHIR server. The conformance testing platform 130 may be configured to perform the operations of the process 400. As shown in FIG. 4, the process 400 may include receiving a declared capability statement of a FHIR server (operation 410). As further shown in FIG. 4, the process 400 may include determining whether a search for a resource is supported by the FHIR server (operation 420). For example, the conformance testing platform 130 may analyze the declared capability statement, and determine whether the search for the resource is supported by the FHIR server 120 based on declared search functionality provided in the declared capability statement. If the search for the resource is supported by the FHIR server (operation 420—YES), then the process 400 may include determining whether a search for the resource using a search parameter of the resource is supported by the FHIR server (operation 430). For example, the conformance testing platform 130 may analyze the declared capability statement, and determine whether the search for the resource using the search parameter of the resource is supported by the FHIR server 120 based on declared search functionality provided in the declared capability statement. If the search of the resource using the search parameter of the resource is supported by the FHIR server (operation 430—YES), then the process 400 may include determining whether a search using a search variation of a type of the search parameter is supported by the FHIR server (operation 440). For example, the conformance testing platform 130 may analyze the declared capability statement, and determine whether the search using the search variation of the type of the search parameter is supported by the FHIR server 120 based on declared search functionality provided in the declared capability statement. If the search using a search variation of a type of the search parameter is supported by the FHIR server (operation 440—YES), then the process 400 may include generating a test script, including a query for the resource stored by the FHIR server using a search value of the search parameter of the resource and using the search variation of the type of the search parameter (operation 450).

According to an embodiment, the conformance testing platform 130 may determine a resource, a search parameter of the resource, and a search variation of a type of the search parameter for which to generate a query based on predetermined information that identifies a resource, a search parameter of the resource, and a search variation of a type of the search parameter for which to generate a query. For example, FIG. 5 is a flowchart of an example process 500 for determining a resource, a search parameter of the resource, and a search variation of a type of the search parameter for which to generate a query based on predetermined information that identifies a resource, a search parameter of the resource, and a search variation of a type of the search parameter for which to generate a query. The conformance testing platform 130 may be configured to perform the operations of the process 500. As shown in FIG. 5, the process 500 may include receiving predetermined information that identifies a resource, a search parameter of the resource, and a search variation of a type of the search parameter for which to generate a query (operation 510). As further shown in FIG. 5, the process 500 may include determining the resource, the search parameter of the resource, and the search variation of the type of the search parameter for which to generate the query based on the predetermined information (operation 520). As further shown in FIG. 5, the process 500 may include generating a test script, including a query for the resource stored by the FHIR server using a search value of the search parameter of the resource and using the search variation of the type of the search parameter (operation 530).

Figure 6:
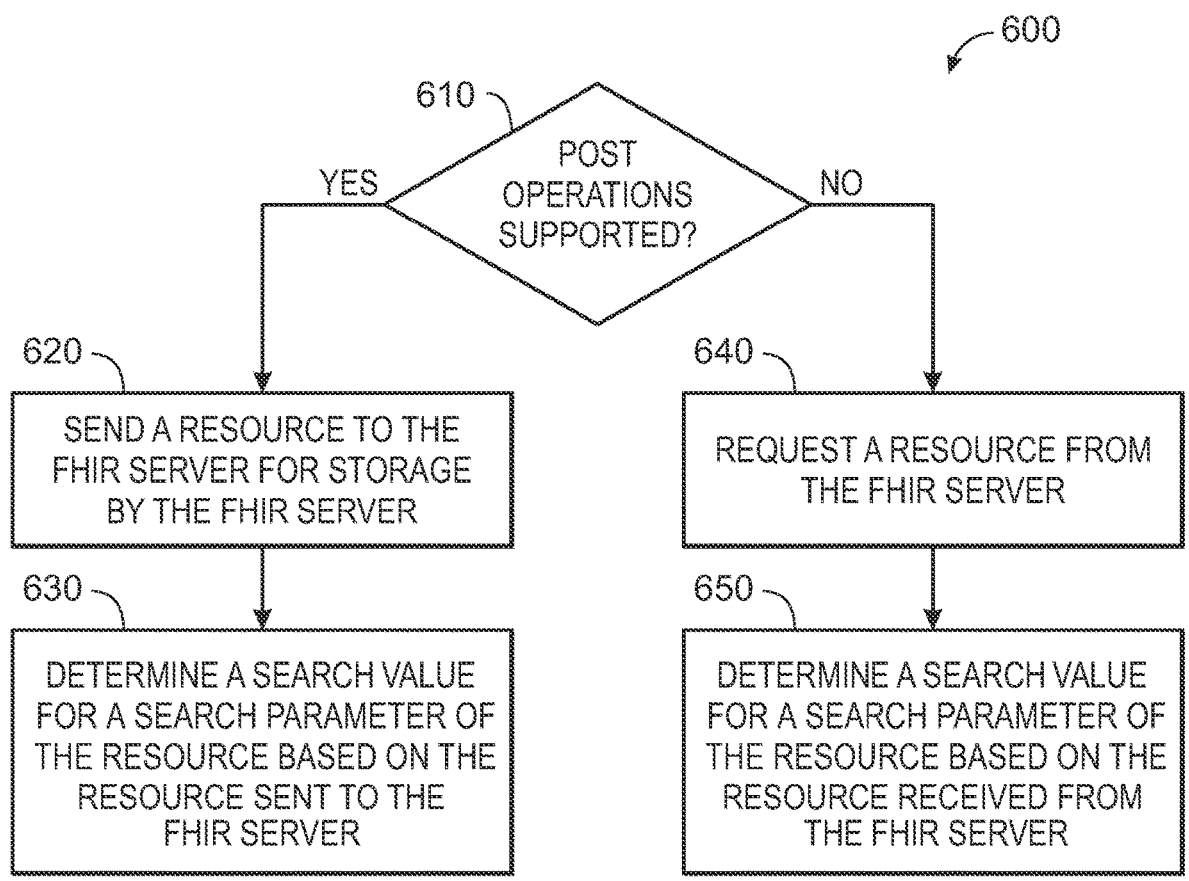
FIG. 6 is a flowchart of an example process for determining a search value of a search parameter of a resource.

According to an embodiment, the conformance testing platform 130 may determine a search value for a search parameter of a resource. FIG. 6 is a flowchart of an example process 600 for determining a search value of a search parameter of a resource. As shown in FIG. 6, the process 600 may include determining whether the FHIR server supports POST operations (operation 610). If the FHIR server accepts POST operations (operation 610—YES), then the process 600 may include sending a resource to the FHIR server for storage by the FHIR server (operation 620). As further shown in FIG. 6, the process 600 may include determining a search value for a search parameter of a resource based on the resource sent to the FHIR server (operation 630). As shown in FIG. 6, if the FHIR server does not accept POST operations (operation 610—NO), then the process 600 may include requesting a resource from the FHIR server (operation 640). As further shown in FIG. 6, the process 600 may include determining a search value for a search parameter of a resource based on a resource received from the FHIR server (operation 650).

According to an embodiment, the conformance testing platform 130 may generate a query for a resource stored by the FHIR server 120 using a search value of a search parameter of the resource, and using a search variation of a type of the search parameter.

According to an embodiment, the type of the search parameter may be a string search. In this case, the string search may be associated with search variations of search by equals, search by the exact modifier, search by the contains modifier, search by multiple AND, search by multiple OR, search by POST, or the like.

According to an embodiment, the conformance testing platform 130 may generate the query using a template for the search variation of search by equals. For example, the template for the query may be "GET [base]/ResourceType?param=START_SEARCH_VALUE." Further, the assertion for the query may be "one or more resources found and the one or more resources has a value starting with START_SEARCH_VALUE." In this case, "SEARCH_VALUE" may be the search value, and "START_ SEARCH_VALUE" may be the search value that is shortened by one or more characters. As another example, the template for the query may be "GET [base]/ResourceType?param=INVERTED_CASE_SEARCH_VALUE." Further, the assertion for the query may be "one or more resources found && the one or more found resources has a value starting with INVERTED_CASE_SEARCH_VALUE." In this case, "SEARCH_VALUE" may be the search value, and "INVERTED_CASE_SEARCH_VALUE" may be the search value having inverted case for all characters. As another example, the template for the query may be "GET [base]/ResourceType?param=AABBSEARCH_VALUE." Further, the assertion for the query may be "no resource found." As another example, the template for the query may be "GET [base]/ResourceType?param=AABB." Further, the assertion for the query may be "no resource found."

According to an embodiment, the conformance testing platform 130 may generate the query using a template for the search variation of search by the exact modifier. For example, the template for the query may be "GET [base]/ResourceType?param: exact=SEARCH_VALUE." Further, the assertion for the query may be "many resources found && the found resources have a value exactly equal to SEARCH_VALUE." As another example, the template for the query may be "GET [base]/ResourceType?param: exact=START_SEARCH_VALUE." Further, the assertion for the query may be "no resource found OR found resources have a value exactly equal to START_SEARCH_VALUE." As another example, the template for the query may be "GET [base]/ResourceType?param: exact=INVERTED_CASE_SEARCH_VALUE." Further, the assertion may be "no resources found OR found resources have a value exactly equal to INVERTED_ CASE_SEARCH_VALUE."

According to an embodiment, the conformance testing platform 130 may generate the query using a template for the search variation of search by the contains modifier. For example, the template for the query may be "GET [base]/ Resource Type?param: contains=MIDDLE_SEARCH_VALUE." Further, the assertion for the query may be "many resources found && found resources have values containing MIDDLE_SEARCH_VALUE." In this case, "MIDDLE_SEARCH_VALUE" may be one or more characters of the search value without one or more first and last characters.

According to an embodiment, the conformance testing platform 130 may generate the query using a template for the search variation of search by multiple AND. For example, the template for the query may be "GET [base]/ ResourceType?param=SEARCH_VALUE&param= AABBSEARCH_VALUE." Further, the assertion may be "no resource found."

According to an embodiment, the conformance testing platform 130 may generate the query using a template for the search variation of search by multiple OR. For example, the template for the query may be "GET [base]/Resource Type?param=SEARCH_VALUE,AA." Further, the assertion for the query may be "many resources found && the found resources have a value starting with SEARCH_VALUE." As another example, the template for the query may be "GET [base]/ResourceType?param=AA, SEARCH_VALUE." Further, the assertion for the query may be "many resources found && the found resources have a value starting with SEARCH_VALUE." As another example, the template for the query may be "GET [base]/ ResourceType?param=AA,BB." Further, the assertion for the query may be "no resource found."

According to an embodiment, the conformance testing platform 130 may generate the query using a template for the search variation of search by POST. For example, the template for the query may be "POST [base]/ResourceType param=SEARCH_VALUE." Further, the assertion may be "many resources found && the found resources have a value starting with SEARCH_VALUE." As another example, the template for the query may be "POST [base]/ResourceType param=AABBSEARCH_VALUE." Further, the assertion may be "no resource found." As another example, the template for the query may be "POST [base]/ResourceType param=AABB." Further, the assertion may be "no resource found."

According to an embodiment, the type of the search parameter may be a date search. In this case, the date search may be associated with search variations of search by equals, search by POST, search by multiple OR, search by multiple AND, search by prefix "eq," search by prefix "ge," search by prefix "gt," search by prefix "le," search by prefix "lt," search by prefix "ne," search by prefix "ap," search by prefix "sa," search by prefix "eb," or the like.

According to an embodiment, the conformance testing platform 130 may generate the query using a template for the search variation of search by equals. For example, the template for the query may be "GET [base]/ ResourceType?param=BEGIN_SEARCH_VALUE." Further, the assertion may be "many resources found && the found resources respect the interval asked." "BEGIN_ SEARCH_VALUE" may indicate the beginning of a period of the search value. As another example, the template for the query may be "GET [base]/ResourceType?param=(BEGIN_ SEARCH_VALUE−1 year)." Further, the assertion may be "no resource found, or all the resources found match the specified criteria." As another example, the template for the query may be "GET [base]/ResourceType?param=2012 Dec. 12." Further, the assertion for the query may be "no resource found, or all the resources found match the specified criteria."

According to an embodiment, the conformance testing platform 130 may generate the query using a template for the search variation of search by POST. For example, the template for the query may be "POST [base]/ResourceType param=BEGIN_SEARCH_VALUE." Further, the assertion for the query may be "many resources found && the found resources respect the interval asked." As another example, the template for the query may be "POST [base]/Resource-Type param=(BEGIN_SEARCH_VALUE−1 year)." Further, the assertion for the query may be "no resource found, or all the resources found match the specified criteria." As another example, the template for the query may be "POST [base]/ResourceType param=2012 Dec. 12." Further, the assertion may be "no resource found, or all the resources found match the specified criteria."

According to an embodiment, the conformance testing platform 130 may generate the query using a template for the search variation of search by multiple OR. As an example, the template for the query may be "GET [base]/ ResourceType?param=BEGIN_SEARCH_VALUE,2020-02-03." Further, the assertion for the query may be "many resources found && the found resources respect the interval asked." As another example, the template for the query may be "GET [base]/ResourceType?param=2020 Feb. 3,BEGIN_ SEARCH_VALUE." Further, the assertion for the query may be "many resources found && the found resources respect the interval asked."

As another example, the template for the query may be "GET [base]/ResourceType?param=2020 Feb. 3, 1996 Mar. 5." Further, the assertion for the query may be "no resource found OR the found resources respect the interval asked."

According to an embodiment, the conformance testing platform 130 may generate the query using a template for the search variation of search by multiple AND. As an example, the template for the query may be "GET [base]/ ResourceType?param=gcBEGIN_SEARCH_VALUE& param=leEND_SEARCH_VALU E." "END_ SEARCH_VALUE" may indicate an end of the period of the search value. Further, the assertion for the query may be "many resources found && the found resources respect the interval asked." As another example, the template for the query may be "GET [base]/ResourceType?param=gc (BEGIN_SEARCH_VALUE+1y) ¶m=le(END_SEARCH VALUE−1y)." Further, the assertion for the query may be "many resources found && the found resources respect the interval asked."

According to an embodiment, the conformance testing platform 130 may generate the query using a template for the search variation of search by prefix "eq." As an example, the template for the query may be "GET [base]/ ResourceType?param=cqBEGIN_SEARCH_VALUE." Further, the assertion for the query may be "many resources found && found resources respect the interval asked." As another example, the template for the query may be "GET [base]/ResourceType?param=eq(BEGIN_SEARCH_VALUE−1 year)." Further, the assertion for the query may be "no resource found, or all the resources found match the specified criteria." As another example, the template for the query may be "GET [base]/ResourceType?param=eq2012-12-12." Further, the assertion for the query may be "no resource found, or all the resources found match the specified criteria."

According to an embodiment, the conformance testing platform 130 may generate the query using a template for the search variation of search by prefix "ge." As an example, the template for the query may be "GET [base]/ResourceType?param=geBEGIN_SEARCH_VALUE." Further, the assertion for the query may be "many resources found && the found resources respect the interval asked." As another example, the template for the query may be "GET [base]/ResourceType?param=ge (END_SEARCH_VALUE+1 year)." Further, the assertion for the query may be "no resource found OR the found resources respect the interval asked." As another example, the template for the query may be "GET [base]/ResourceType?param=ge(BEGIN_SEARCH_VALUE.getY( ))." Further, the assertion for the query may be "many resources found && the found resources respect the interval asked." As another example, the template for the query may be "GET [base]/ResourceType?param=ge(BEGIN_SEARCH_VALUE.getY-M( ))." Further, the assertion for the query may be "many resources found && the found resources respect the interval asked." As another example, the template for the query may be "GET [base]/ResourceType?param=ge (BEGIN_SEARCH_VALUE.getY-M-D( ))." Further, the assertion for the query may be "many resources found && the found resources respect the interval asked." "getY( )" may indicate a method to extract the year of the date value. "getY-M( )" may indicate a method to extract the year and the month date values. "getY-M-D( )" may indicate a method to extract the year, month, and day values.

According to an embodiment, the conformance testing platform 130 may generate the query using a template for the search variation of search by prefix "gt." As an example, the template for the query may be "GET [base]/ResourceType?param=gt(BEGIN_SEARCH_VALUE−1d)." Further, the assertion for the query may be "Many resources found && the found resources respect the interval asked." As another example, the template for the query may be "GET [base]/ResourceType?param=gt(END_SEARCH_VALUE+1y)." Further, the assertion for the query may be "no resource found OR the found resources respect the interval asked." As another example, the template for the query may be "GET [base]/ResourceType?param=gt(BEGIN_SEARCH_VALUE−1y). getY( )" Further, the assertion for the query may be "many resources found && the found resources respect the interval asked." As another example, the template for the query may be "GET [base]/ResourceType?param=gt(BEGIN_SEARCH_VALUE−1M).getY-M( )" Further, the assertion for the query may be "many resources found && the found resources respect the interval asked." As another example, the template for the query may be "GET [base]/ResourceType?param=gt(BEGIN_SEARCH_VALUE−1d). getY-M-D( )" Further, the assertion for the query may be "many resources found && the found resources respect the interval asked."

According to an embodiment, the conformance testing platform 130 may generate the query using a template for the search variation of search by prefix "le." As an example, the template for the query may be "GET [base]/ResourceType?param=le(END_SEARCH_VALUE)." Further, the assertion for the query may be "many resources found && the found resources respect the interval asked." As another example, the template for the query may be "GET [base]/ResourceType?param=le(BEGIN_SEARCH_VALUE−1y)." Further, the assertion for the query may be "no resource found OR the found resources respect the interval asked." As another example, the template for the query may be "GET [base]/ResourceType?param=le(END_SEARCH_VALUE). getY( )" Further, the assertion for the query may be "many resources found && the found resources respect the interval asked." As another example, the template for the query may be "GET [base]/ResourceType?param=le(END_SEARCH_VALUE).getY-M( )" Further, the assertion for the query may be "many resources found && the found resources respect the interval asked." As another example, the template for the query may be "GET [base]/ResourceType?param=le(END_SEARCH_VALUE).getY-M-D( )" Further, the assertion for the query may be "many resources found && the found resources respect the interval asked."

According to an embodiment, the conformance testing platform 130 may generate the query using a template for the search variation of search by prefix "lt." As an example, the template for the query may be "GET [base]/ResourceType?param=lt(BEGIN_SEARCH_VALUE+1s)." Further, the assertion for the query may be "many resources found && the found resources respect the interval asked." As another example, the template for the query may be "GET [base]/ResourceType?param=lt(BEGIN_SEARCH_VALUE−1s)." Further, the assertion for the query may be "no resource found OR the found resources respect the interval asked." As another example, the template for the query may be "GET [base]/ResourceType?param=lt(BEGIN_SEARCH_VALUE+1y).getY( )" Further, the assertion for the query may be "many resources found && the found resources respect the interval asked." As another example, the template for the query may be "GET [base]/ResourceType?param=lt(BEGIN_SEARCH_VALUE+1M). getY-M( )" Further, the assertion for the query may be "many resources found && the found resources respect the interval asked." As another example, the template for the query may be "GET [base]/ResourceType?param=lt(BEGIN_SEARCH_VALUE+1d).getY-M-D( )" Further, the assertion for the query may be "many resources found && the found resources respect the interval asked."

According to an embodiment, the conformance testing platform 130 may generate the query using a template for the search variation of search by prefix "ne." As an example, the template for the query may be "GET [base]/ResourceType?param=ne (BEGIN_SEARCH_VALUE)." Further, the assertion for the query may be "no resource found OR the found resources respect the interval asked." As another example, the template for the query may be "GET [base]/ResourceType?param=ne (BEGIN_SEARCH_VALUE−1y)." Further, the assertion for the query may be "many resources found && the found resources respect the interval asked."

According to an embodiment, the conformance testing platform 130 may generate the query using a template for the search variation of search by prefix "ap."

As an example, the template for the query may be "GET [base]/ResourceType?param=ap(BEGIN_SEARCH_VALUE)." Further, the assertion for the query may be "many resources found && the found resources respect the interval asked." As another example, the template for the query may be "GET [base]/ResourceType?param=ap(BEGIN_SEARCH_VALUE−1y)." Further, the assertion for the query may be "no resource found OR the found resources respect the interval asked." As another example, the template for the query may be "GET [base]/ResourceType?param=ap(BEGIN_SEARCH_VALUE+1s)." Further, the assertion for the query may be "Many resources found && the found resources respect the interval asked." As another example, the template for the query may be "GET [base]/ResourceType?param=ap(BEGIN_SEARCH_VALUE−1s)." Further, the assertion for the query may be "many resources found && the found resources respect the interval asked."

According to an embodiment, the conformance testing platform 130 may generate the query using a template for the search variation of search by prefix "sa." As an example, the template for the query may be "GET [base]/ResourceType?param=sa(BEGIN_SEARCH_VALUE−1s)." Further, the assertion for the query may be "Many resources found && the found resources respect the interval asked." As another example, the template for the query may be "GET [base]/ResourceType?param=sa(BEGIN_SEARCH_VALUE+1y)." Further, the assertion for the query may be "no resource found OR the found resources respect the interval asked."

According to an embodiment, the conformance testing platform 130 may generate the query using a template for the search variation of search by prefix "eb." As an example, the template for the query may be "GET [base]/ResourceType?param=eb(END_SEARCH_VALUE+1d)." Further, the assertion for the query may be "many resources found && the found resources respect the interval asked." As another example, the template for the query may be "GET [base]/ResourceType?param=eb(END_SEARCH_VALUE−1y)." Further, the assertion for the query may be "no resource found OR the found resources respect the interval asked."

According to an embodiment, the type of the search parameter may be a number search.

In this case, the number search may be associated with search variations of search by equals, search by multiple OR, search by multiple AND, search by POST, search by prefix "eq," search by prefix "ge," search by prefix "le," search by prefix "gt," search by prefix "lt," search by prefix "ne," search by prefix "ap," search by prefix "eb," search by prefix "sa," search by range, or the like.

According to an embodiment, the conformance testing platform 130 may generate the query using a template for the search variation of search by equals. As an example, the template for the query may be "GET [base]/ResourceType?param=SEARCH_VALUE." Further, the assertion for the query may be "many resources found && the found resources respect the value asked." As another example, the template for the query may be "GET [base]/ResourceType?param=5." Further, the assertion for the query may be "no resource found OR found resources respect the value asked."

According to an embodiment, the conformance testing platform 130 may generate the query using a template for the search variation of search by multiple OR.

As an example, the template for the query may be "GET [base]/ResourceType?param=SEARCH_VALUE,5." Further, the assertion for the query may be "many resources found && the found resources respect the interval asked." As another example, the template for the query may be "GET [base]/ResourceType?param=5,SEARCH_VALUE. Further, the assertion for the query may be "many resources found && the found resources respect the interval asked." As another example, the template for the query may be "GET [base]/ResourceType?param=5,6." Further, the assertion for the query may be "no resource found OR the found resources respect the interval asked."

According to an embodiment, the conformance testing platform 130 may generate the query using a template for the search variation of search by multiple AND. As an example, the template for the query may be "GET [base]/ResourceType?param=SEARCH_VALUE&param=12543 5431." Further, the assertion for the query may be "no resources found if search value!=125435431."

According to an embodiment, the conformance testing platform 130 may generate the query using a template for the search variation of search by POST. As an example, the template for the query may be "POST [base]/ResourceType param=SEARCH_VALUE." Further, the assertion for the query may be "many resources found && the found resources respect the value asked." As another example, the template for the query may be "POST [base]/Resource Type param=5." Further, the assertion for the query may be "no resource found OR the found resources respect the value asked."

According to an embodiment, the conformance testing platform 130 may generate the query using a template for the search variation of search by prefix "eq." As an example, the template for the query may be "GET [base]/ResourceType?param=cq(SEARCH_VALUE). Further, the assertion for the query may be "many resources found && the found resources respect the value asked." As another example, the template for the query may be "GET [base]/ResourceType?param=eq5." Further, the assertion for the query may be "no resource found OR the found resources respect the value asked."

According to an embodiment, the conformance testing platform 130 may generate the query using a template for the search variation of search by prefix "ge." As an example, the template for the query may be "GET [base]/ResourceType?param=ge(SEARCH_VALUE)." Further, the assertion for the query may be "many resources found && the found resources respect the value asked." As another example, the template for the query may be "GET [base]/ResourceType?param=ge(SEARCH_VALUE+1)." Further, the assertion for the query may be "no resource found OR the found resources respect the value asked." As another example, the template for the query may be "GET [base]/ResourceType?param=ge6." Further, the assertion for the query may be "no resource found OR the found resources respect the value asked."

According to an embodiment, the conformance testing platform 130 may generate the query using a template for the search variation of search by prefix "le." As an example, the template for the query may be "GET [base]/ResourceType?param=le(SEARCH_VALUE)." Further, the assertion for the query may be "many resources found && the found resources respect the value asked." As another example, the template for the query may be "GET [base]/ResourceType?param=le(SEARCH_VALUE−1)." Further, the assertion for the query may be "No resource found OR the found resources respect the value asked." As another example, the template for the query may be "GET [base]/ResourceType?param=le6." Further, the assertion for the query may be "no resource found OR the found resources respect the value asked."

According to an embodiment, the conformance testing platform 130 may generate the query using a template for the search variation of search by prefix "gt." As an example, the template for the query may be "GET [base]/ResourceType?param=gt(SEARCH_VALUE)." Further, the assertion for the query may be "no resource found OR the found resources respect the value asked." As another example, the template for the query may be "GET [base]/ResourceType?param=gt(SEARCH_VALUE-1)." Further, the assertion for the query may be "many resources found && the found resources respect the value asked." As another example, the template for the query may be "GET [base]/ResourceType?param=gt6." Further, the assertion for the query may be "no resource found OR the found resources respect the value asked."

According to an embodiment, the conformance testing platform 130 may generate the query using a template for the search variation of search by prefix "lt." As an example, the template for the query may be "GET [base]/ResourceType?param=lt(SEARCH_VALUE)." Further, the assertion for the query may be "no resource found OR the found resources respect the value asked." As another example, the template for the query may be "GET [base]/ResourceType?param=lt(SEARCH_VALUE+1)." Further, the assertion for the query may be "many resources found && the found resources respect the value asked." As another example, the template for the query may be "GET [base]/ResourceType?param=lt6." Further, the assertion for the query may be "No resource found OR the found resources respect the value asked."

According to an embodiment, the conformance testing platform 130 may generate the query using a template for the search variation of search by prefix "ne." As an example, the template for the query may be "GET [base]/ResourceType?param=ne (SEARCH_VALUE)." Further, the assertion for the query may be "no resource found OR the found resources respect the value asked." As another example, the template for the query may be "GET [base]/ResourceType?param=ne (SEARCH_VALUE+1)." Further, the assertion for the query may be "many resources found && the found resources respect the value asked." As another example, the template for the query may be "GET [base]/ResourceType?param=ne6." Further, the assertion for the query may be "no resource found OR the found resources respect the value asked."

According to an embodiment, the conformance testing platform 130 may generate the query using a template for the search variation of search by prefix "ap." As an example, the template for the query may be "GET [base]/ResourceType?param=ap(SEARCH_VALUE)." Further, the assertion for the query may be "many resources found && the found resources respect the value asked." As another example, the template for the query may be "GET [base]/ResourceType?param=ap(SEARCH_VALUE+1)." Further, the assertion for the query may be "many resources found && the found resources respect the value asked." As another example, the template for the query may be "GET [base]/ResourceType?param=ap6." Further, the assertion for the query may be "no resource found OR the found resources respect the value asked."

According to an embodiment, the conformance testing platform 130 may generate the query using a template for the search variation of search by range." As an example, the template for the query may be "GET [base]/ResourceType?param=gt(SEARCH_VALUE) < (SEARCH_VALUE)." Further, the assertion for the query may be "no resource found." As another example, the template for the query may be "GET [base]/ResourceType?param=gt(SEARCH_VALUE-1) ¶m=lt(SEARCH_VALUE+1)." Further, the assertion for the query may be "many resources found && the found resources respect the value asked." As another example, the template for the query may be "GET [base]/ResourceType?param=gt6&param=lt5." Further, the assertion for the query may be "no resource found."

According to an embodiment, the type of the search parameter may be a quantity search.

In this case, the search may be associated with search variations of search by equals using the search value, search by equals using the search value, system, and unit, search by multiple OR, search by multiple AND, search by POST, search by prefix "eq," search by prefix "ge," search by prefix "le," search by prefix "gt," search by prefix "lt," search by prefix "ne," search by prefix "ap," search by prefix "eb," search by prefix "sa," search by range, or the like.

According to an embodiment, the conformance testing platform 130 may generate the query using a template for the search variation of search by equals using the search value. As an example, the template for the query may be "GET [base]/ResourceType?param=SEARCH_VALUE." Further, the assertion for the query may be "many resources found && the found resources respect the value asked." As another example, the template for the query may be "GET [base]/Resource Type?param=5." Further, the assertion for the query may be "no resource found OR the found resources respect the value asked."

According to an embodiment, the conformance testing platform 130 may generate the query using a template for the search variation of search by equals using the search value, system, and unit. As an example, the template for the query may be "GET [base]/ResourceType?param=SEARCH_VALUE|SYS|UNIT." Further, the assertion for the query may be "many resources found && the found resources respect the value asked. As another example, the template for the query may be "GET [base]/ResourceType?param=5|SYS|UNIT." Further, the assertion for the query may be "no resource found OR the found resources respect the value asked."

According to an embodiment, the conformance testing platform 130 may generate the query using a template for the search variation of search by multiple OR. As an example, the template for the query may be "GET [base]/ResourceType?param=SEARCH_VALUE,5." Further, the assertion for the query may be "many resources found && the found resources respect the interval asked." As another example, the template for the query may be "GET [base]/ResourceType?param=5,SEARCH_VALUE." Further, the assertion for the query may be "many resources found && the found resources respect the interval asked." As another example, the template for the query may be "GET [base]/Resource Type?param=5,6." Further, the assertion for the query may be "no resource found OR found resources respect the interval asked."

According to an embodiment, the conformance testing platform 130 may generate the query using a template for the search variation of search by multiple AND. As an example, the template for the query may be "GET [base]/ResourceType?param=SEARCH_VALUE&param=12543 5431." Further, the assertion for the query may be "no resources found."

According to an embodiment, the conformance testing platform 130 may generate the query using a template for the search variation of search by POST.

As an example, the template for the query may be "POST [base]/Resource Type param=SEARCH_VALUE." Further, the assertion for the query may be "many resources found && the found resources respect the value asked." As an example, the template for the query may be "POST [base]/Resource Type param=5." Further, the assertion for the query may be "No resource found OR the found resources respect the value asked."

According to an embodiment, the conformance testing platform 130 may generate the query using a template for the search variation of search by prefix "eq." As an example, the template for the query may be "GET [base]/ResourceType?param=eqSEARCH_VALUE." Further, the assertion for the query may be "many resources found && the found resources respect the value asked." As another example, the template for the query may be "GET [base]/ResourceType?param=eq5." Further, the assertion for the query may be "no resource found OR the found resources respect the value asked."

According to an embodiment, the conformance testing platform 130 may generate the query using a template for the search variation of search by prefix "ge." As an example, the template for the query may be "GET [base]/ResourceType?param=geSEARCH_VALUE." Further, the assertion for the query may be "many resources found && the found resources respect the value asked." As another example, the template for the query may be "GET [base]/ResourceType?param=ge(SEARCH_VALUE+1)." Further, the assertion for the query may be "no resource found OR the found resources respect the value asked." As another example, the template for the query may be "GET [base]/ResourceType?param=ge6." Further, the assertion for the query may be "no resource found OR the found resources respect the value asked."

According to an embodiment, the conformance testing platform 130 may generate the query using a template for the search variation of search by prefix "le." As an example, the template for the query may be "GET [base]/ResourceType?param=leSEARCH_VALUE." Further, the assertion for the query may be "many resources found && the found resources respect the value asked." As another example, the template for the query may be "GET [base]/ResourceType?param=le(SEARCH_VALUE-1)." Further, the assertion for the query may be "no resource found OR the found resources respect the value asked." As another example, the template for the query may be "GET [base]/Resource Type?param=le6." Further, the assertion for the query may be "no resource found OR the found resources respect the value asked."

According to an embodiment, the conformance testing platform 130 may generate the query using a template for the search variation of search by prefix "gt." As an example, the template for the query may be "GET [base]/ResourceType?param=gtSEARCH_VALUE." Further, the assertion for the query may be "no resource found OR the found resources respect the value asked." As another example, the template for the query may be "GET [base]/ResourceType?param=gt(SEARCH_VALUE-1)." Further, the assertion for the query may be "many resources found && the found resources respect the value asked." As another example, the template for the query may be "GET [base]/ResourceType?param=gt6." Further, the assertion for the query may be "no resource found OR the found resources respect the value asked."

According to an embodiment, the conformance testing platform 130 may generate the query using a template for the search variation of search by "lt." As an example, the template for the query may be "GET [base]/ResourceType?param=ltSEARCH_VALUE." Further, the assertion for the query may be "no resource found OR the found resources respect the value asked." As another example, the template for the query may be "GET [base]/ResourceType?param=lt(SEARCH_VALUE+1)." Further, the assertion for the query may be "many resources found && the found resources respect the value asked." As another example, the template for the query may be "GET [base]/ResourceType?param=lt6." Further, the assertion for the query may be "no resource found OR the found resources respect the value asked."

According to an embodiment, the conformance testing platform 130 may generate the query using a template for the search variation of search by prefix "ne." As an example, the template for the query may be "GET [base]/ResourceType?param=neSEARCH_VALUE." Further, the assertion for the query may be "no resource found OR the found resources respect the value asked." As another example, the template for the query may be "GET [base]/ResourceType?param=ne (SEARCH_VALUE+1)." Further, the assertion for the query may be "many resources found && the found resources respect the value asked." As another example, the template for the query may be "GET [base]/ResourceType?param=ne6." Further, the assertion for the query may be "no resource found OR the found resources respect the value asked."

According to an embodiment, the conformance testing platform 130 may generate the query using a template for the search variation of search by prefix "ap." As an example, the template for the query may be "GET [base]/ResourceType?param=apSEARCH_VALUE." Further, the assertion for the query may be "many resources found && the found resources respect the value asked." As another example, the template for the query may be "GET [base]/ResourceType?param=ap(SEARCH_VALUE+1)." Further, the assertion for the query may be "many resources found && the found resources respect the value asked." As another example, the template for the query may be "GET [base]/ResourceType?param-ap6." Further, the assertion for the query may be "no resource found OR the found resources respect the value asked."

According to an embodiment, the conformance testing platform 130 may generate the query using a template for the search variation of search by prefix "eb." As an example, the template for the query may be "GET [base]/ResourceType?param=eb(SEARCH_VALUE-1)." Further, the assertion for the query may be "No resources found OR the found resources respect the value asked." As another example, the template for the query may be "GET [base]/ResourceType?param=eb(SEARCH_VALUE+1)." Further, the assertion for the query may be "many resources found && the found resources respect the value asked." As an example, the template for the query may be "GET [base]/ResourceType?param-eb6." Further, the assertion for the query may be "No resource found OR the found resources respect the value asked."

According to an embodiment, the conformance testing platform 130 may generate the query using a template for the search variation of search by prefix "sa." As an example, the template for the query may be "GET [base]/ResourceType?param=sa (SEARCH_VALUE+1). Further, the assertion for the query may be "no resource found OR the found resources respect the value asked." As another example, the template for the query may be "GET [base]/ResourceType?param=sa (SEARCH_VALUE-1)." Further, the assertion for the query may be "many resources found && the found resources respect the value asked." As another example, the template for the query may be "GET [base]/ResourceType?param=sa6." Further, the assertion for the query may be "no resource found OR the found resources respect the value asked."

According to an embodiment, the conformance testing platform 130 may generate the query using a template for the search variation of search by range. As an example, the template for the query may be "GET [base]/ResourceType?param=gtSEARCH_VALUE<SEARCH_VALUE." Further, the assertion for the query may be "no resource found." As another example, the template for the query may be "GET [base]/ResourceType?param=gt(SEARCH_VALUE-1) ¶m=lt(SEARCH_VALUE+1)." Further, the assertion for the query may be "many resources found && the found resources respect the value asked." As another example, the template for the query may be "GET [base]/ResourceType?param=gt6&param=lt5." Further, the assertion for the query may be "No resource found."

According to an embodiment, the type of the search parameter may be a reference search. In this case, the search may be associated with search variations of search by equals with ID, search by equals with resource/ID, search by equals with URL, search by multiple OR, search by multiple AND, search by POST, or the like.

According to an embodiment, the conformance testing platform 130 may generate the query using a template for the search variation of search by equals with ID. As an example, the template for the query may be "GET [base]/ResourceType?param=SEARCH_VALUE ID." Further, the assertion for the query may be "many resources found && the found resources respect the value asked." As another example, the template for the query may be "GET [base]/ResourceType?param=AASEARCH_VALUE_ID." Further, the assertion for the query may be "no resource found OR the found resources respect the value asked."

According to an embodiment, the conformance testing platform 130 may generate the query using a template for the search variation of search by equals with resource/ID. As an example, the template for the query may be "GET [base]/ResourceType?param=SEARCH_VALUE RES TYPE/SEARCH_VALUE_ID." Further, the assertion for the query may be "many resources found && the found resources respect the value asked."

According to an embodiment, the conformance testing platform 130 may generate the query using a template for the search variation of search by equals using resource/ID. As an example, the template for the query may be "GET [base]/ResourceType?param=SEARCH_VALUE_RES_TYPE/SEARCH_VALUE_ID." Further, the assertion for the query may be "many resources found && the found resources respect the value asked."

According to an embodiment, the conformance testing platform 130 may generate the query using a template for the search variation of search by equals using URL.

As an example, the template for the query may be "GET [base]/ResourceType?param=[baseUrl]/SEARCH_VALUE_RES_TYPE/SEARCH_VALUE_ID." Further, the assertion for the query may be "many resources found && the found resources respect the value asked."

According to an embodiment, the conformance testing platform 130 may generate the query using a template for the search variation of search by multiple OR. As an example, the template for the query may be "GET [base]/ResourceType?param=SEARCH_VALUE,AA." Further, the assertion for the query may be "many resources found && the found resources respect the values asked." As another example, the template for the query may be "base]/ResourceType?param=AA,SEARCH_VALUE." Further, the assertion for the query may be "many resources found && the found resources respect the values asked." As another example, the template for the query may be "GET [base]/ResourceType?param=AA,BB." Further, the assertion for the query may be "no resource found OR the found resources respect the values asked."

According to an embodiment, the conformance testing platform 130 may generate the query using a template for the search variation of search by multiple AND. As an example, the template for the query may be "GET [base]/ResourceType?param=SEARCH_VALUE&param=AA." Further, the assertion for the query may be "no resources found."

According to an embodiment, the conformance testing platform 130 may generate the query using a template for the search variation of search by POST. As an example, the template for the query may be "POST [base]/Resource Type param=SEARCH_VALUE." Further, the assertion for the query may be "many resources found && the found resources respect the value asked." As another example, the template for the query may be "POST [base]/ResourceType param=AASEARCH_VALUE." Further, the assertion for the query may be "no resource found OR the found resources respect the value asked."

According to an embodiment, the type of the search parameter may be a URI search. In this case, the search may be associated with search variations of search by equals, search by multiple OR, search by multiple AND, search by POST, search by the above modifier, search by the below modifier, search by URL, or the like.

According to an embodiment, the conformance testing platform 130 may generate the query using a template for the search variation of search by equals. As an example, the template for the query may be "GET [base]/ResourceType?param=SEARCH_VALUE." Further, the assertion for the query may be "many resources found && the found resources respect the value asked." As another example, the template for the query may be "GET [base]/ResourceType?param=SEARCH_VALUEAAA." Further, the assertion for the query may be "no resource found."

According to an embodiment, the conformance testing platform 130 may generate the query using a template for the search variation of search by multiple OR. As an example, the template for the query may be "GET [base]/ResourceType?param=SEARCH_VALUE,http://ge.com/test/." Further, the assertion for the query may be "many resources found && the found resources respect the values asked." As another example, the template for the query may be "GET [base]/ResourceType?param=http://ge.com/test/,SEARCH_VALUE." Further, the assertion for the query may be "many resources found && the found resources respect the values asked." As another example, the template for the query may be "GET [base]/ResourceType?param=http://ge.com/test/, http://ge.com/test2/." Further, the assertion for the query may be "no resources found."

According to an embodiment, the conformance testing platform 130 may generate the query using a template for the search variation of search by multiple AND. As an example, the template for the query may be "GET [base]/

ResourceType?param=SEARCH_VALUE&param=http://ge.com/test/." Further, the assertion for the query may be "no resources found."

According to an embodiment, the conformance testing platform 130 may generate the query using a template for the search variation of search by POST. As an example, the template for the query may be "POST [base]/ResourceType param=SEARCH_VALUE." Further, the assertion for the query may be "many resources found && the found resources respect the value asked." As another example, the template for the query may be "POST [base]/ResourceType param=SEARCH_VALUEAAAA. Further, the assertion for the query may be "no resource found OR the found resources respect the value asked."

According to an embodiment, the conformance testing platform 130 may generate the query using a template for the search variation of search by the above modifier. As an example, the template for the query may be "GET [base]/ResourceType?param: above=SEARCH_VALUE." Further, the assertion for the query may be "many resources found && the found resources respect the value asked." As another example, the template for the query may be "GET [base]/ResourceType?param: above=SEARCH_VALUEAAA."

According to an embodiment, the conformance testing platform 130 may generate the query using a template for the search variation of search by the below modifier. As an example, the template for the query may be "GET [base]/ResourceType?param: below=SEARCH_VALUE." Further, the assertion for the query may be "many resources found && the found resources respect the value asked." As another example, the template for the query may be "GET [base]/ResourceType?param: below=SEARCH_VALUEAAA." Further, the assertion for the query may be "no resources found."

According to an embodiment, the conformance testing platform 130 may generate the query using a template for the search variation of search by URL and version. As an example, the template for the query may be "GET [base]/ResourceType?param: below=SEARCH_VALUE|VERSION." Further, the assertion for the query may be "many resources found && the found resources respect the value asked." As another example, the template for the query may be "GET [base]/ResourceType?param: below SEARCH_VALUE|456456456." Further, the assertion for the query may be "no resource found." "VERSION" may refer to the version of the URL.

According to an embodiment, the type of the search parameter may be a token search.

In this case, the search may be associated with search variations of search by equals using code, search by equals using system and code, search by equals using system, search by equals using multiple OR, search by multiple AND, search by POST, search by the text modifier, search by the not modifier, search by the above modifier, search by the below modifier, search by the of type modifier, search by the above with subsume modifier, search by the below with subsume modifier, search by the in modifier, search by the not in modifier, or the like.

According to an embodiment, the conformance testing platform 130 may generate the query using a template for the search variation of search by equals using code. As an example, the template for the query may be "GET [base]/ResourceType?param=SEARCH_VALUE." Further, the assertion for the query may be "many resources found && the found resources respect the value asked." As another example, the template for the query may be "GET [base]/ResourceType?param=START_SEARCH_VALUE." Further, the assertion for the query may be "no resource found OR the found resources respect the value asked." As another example, the template for the query may be "GET [base]/ResourceType?param=AASEARCH_VALUE." Further, the assertion for the query may be "no resource found OR the found resources respect the value asked."

According to an embodiment, the conformance testing platform 130 may generate the query using a template for the search variation of search by equals using system and code.

As an example, the template for the query may be "GET [base]/ResourceType?param=SYSTEM|SEARCH_VALUE." Further, the assertion for the query may be "many resources found && the found resources respect the value asked." As another example, the template for the query may be "GET [base]/ResourceType?param=SYSTEM|START_SEARCH_VALUE." Further, the assertion for the query may be "no resource found OR the found resources respect the value asked." As another example, the template for the query may be "GET [base]/ResourceType?param=AABB|SEARCH_VALUE." Further, the assertion for the query may be "no resource found OR the found resources respect the value asked."

According to an embodiment, the conformance testing platform 130 may generate the query using a template for the search variation of search by equals using system. As an example, the template for the query may be "GET [base]/Resource Type?param=SYSTEM|." Further, the assertion for the query may be "many resources found && the found resources respect the value asked." As another example, the template for the query may be "GET [base]/ResourceType?param=AABB|.". Further, the assertion for the query may be "No resource found OR Found resources respect the value asked."

According to an embodiment, the conformance testing platform 130 may generate the query using a template for the search variation of search by equals using multiple OR. As an example, the template for the query may be "GET [base]/ResourceType?param=SEARCH_VALUE,AA." Further, the assertion for the query may be "many resources found && the found resources respect the values asked." As another example, the template for the query may be "GET [base]/ResourceType?param=AA, SEARCH_VALUE." Further, the assertion for the query may be "many resources found && the found resources respect the values asked." As another example, the template for the query may be "GET [base]/ResourceType?param=AA,BB." Further, the assertion for the query may be "no resource found OR the found resources respect the values asked."

According to an embodiment, the conformance testing platform 130 may generate the query using a template for the search variation of search by multiple AND. As an example, the template for the query may be "GET [base]/ResourceType?param=SEARCH_VALUE&param=AAAA." Further, the assertion for the query may be "no resources found, if SEARCH_VALUE!=AAAA."

According to an embodiment, the conformance testing platform 130 may generate the query using a template for the search variation of search by POST. As an example, the template for the query may be "POST [base]/ResourceType param=SEARCH_VALUE." Further, the assertion for the query may be "many resources found && the found resources respect the value asked." As another example, the template for the query may be "POST [base]/Resource Type param=SEARCH_VALUEAAAA." Further, the assertion for the query may be "no resource found OR the found resources respect the value asked."

According to an embodiment, the conformance testing platform 130 may generate the query using a template for the search variation of search by the text modifier. As an example, the template for the query may be "GET [base]/ResourceType?param: text=DISPLAY." Further, the assertion for the query may be "many resources found && the found resources respect the value asked." As another example, the template for the query may be "GET [base]/ResourceType?param: text=AABB." Further, the assertion for the query may be "no resource found OR the found resources respect the value asked."

According to an embodiment, the conformance testing platform 130 may generate the query using a template for the search variation of search by the not modifier. As an example, the template for the query may be "GET [base]/ResourceType?param: not=SEARCH_VALUE." Further, the assertion for the query may be "no resource found OR the found resources respect the value asked." As another example, the template for the query may be "GET [base]/ResourceType?param: not=AASEARCH_VALUE." Further, the assertion for the query may be "many resources found && the found resources respect the value asked."

According to an embodiment, the conformance testing platform 130 may generate the query using a template for the search variation of search by the above modifier. As an example, the template for the query may be "GET [base]/ResourceType?param: above=SEARCH_VALUE." Further, the assertion for the query may be "many resources found && the found resources respect the value asked." As another example, the template for the query may be "GET [base]/ResourceType?param: above=AASEARCH_VALUE." Further, the assertion for the query may be "no resource found OR the found resources respect the value asked."

According to an embodiment, the conformance testing platform 130 may generate the query using a template for the search variation of search by the below modifier. As an example, the template for the query may be "GET [base]/ResourceType?param: below=SEARCH_VALUE." Further, the assertion for the query may be "many resources found && the found resources respect the value asked." As another example, the template for the query may be "GET [base]/ResourceType?param: below=AASEARCH_VALUE." Further, the assertion for the query may be "no resource found OR the found resources respect the value asked."

According to an embodiment, the conformance testing platform 130 may generate the query using a template for the search variation of search by the of type modifier. As an example, the template for the query may be "GET [base]/Resource Type?param: of-type=TYPE." Further, the assertion for the query may be "many resources found && the found resources respect the value asked." As another example, the template for the query may be "GET [base]/ResourceType?param: of-type=AA." Further, the assertion for the query may be "no resource found."

According to an embodiment, the type of the search parameter may be a composite search. In this case, the search may be associated with search variations of search by equals, search by multiple OR, search by multiple AND, search by POST, or the like.

According to an embodiment, the conformance testing platform 130 may generate the query using a template for the search variation of search by equals. As an example, the template for the query may be "GET [base]/ResourceType?param=CODE$VALUE." Further, the assertion for the query may be "many resources found && the found resources respect the value asked." As another example, the template for the query may be "GET [base]/ResourceType?param-CODE." Further, the assertion for the query may be "no resource found." As another example, the template for the query may be "GET [base]/ResourceType?param=VALUE." Further, the assertion for the query may be "no resource found." As another example, the template for the query may be "GET [base]/ResourceType?param=CODE$AAAA." Further, the assertion for the query may be "no resource found."

According to an embodiment, the conformance testing platform 130 may generate the query using a template for the search variation of search by multiple OR. As an example, the template for the query may be "GET [base]/ResourceType?param=param=CODE$VALUE, CODE$AA." Further, the assertion for the query may be "many resources found && the found resources respect the values asked." As another example, the template for the query may be "GET [base]/ResourceType?param=CODE$AA, CODE$VALUE." Further, the assertion for the query may be "many resources found && the found resources respect the values asked." As another example, the template for the query may be "GET [base]/ResourceType?param=CODE$AA, CODE$BB." Further, the assertion for the query may be "no resource found."

According to an embodiment, the conformance testing platform 130 may generate the query using a template for the search variation of search by multiple AND. As an example, the template for the query may be "GET [base]/ResourceType?param=CODE$VALUE ¶m=CODE$AA." Further, the assertion for the query may be "no resources found."

According to an embodiment, the conformance testing platform 130 may generate the query using a template for the search variation of search by POST.

As an example, the template for the query may be "POST [base]/ResourceType param-CODE$VALUE." Further, the assertion for the query may be "many resources found && the found resources respect the value asked." As another example, the template for the query may be "POST [base]/ResourceType param=CODE$AA." Further, the assertion for the query may be "no resource found."

According to an embodiment, the search may be associated with the missing modifier. For example, a template for the query may be "GET [base]/ResourceType?param: missing=true." Further, the assertion may be "all resources returned shall not have a value." As another example, the template for the query may be "GET [base]/ResourceType?param: missing=false." Further, the assertion may be "all resources returned shall have a value."

According to an embodiment, the query might not include a search parameter. For example, the conformance testing platform 130 may generate a query without a search parameter. As an example, a template for the query may be "GET [base]/ResourceType." Further, the assertion for the query may be "more than zero resources returned."

According to an embodiment, the type of the search parameter may be a mixed search parameter. For example, the conformance testing platform 130 may generate a query including multiple search parameters. The conformance testing platform 130 may be configured to generate the query using any permutation or combination of search parameters.

According to an embodiment, the conformance testing platform 130 may generate the query using various modifiers."

For example, the conformance testing platform 130 may generate the query using the sort modifier. In this case, the template for the query may be "GET [base]/ResourceType?_sort=param." Further, the assertion for the query may be "the search respects the specified ascending order." As another example, the template for the query may be "GET [base]/ResourceType?_sort=-param." Further, the assertion for the query may be "the search respects the specified descending order."

As another example, the conformance testing platform 130 may generate the query using the total modifier. In this case, the template for the query may be "GET [base]/ResourceType?_total=1." Further, the assertion for the query may be "only one returned." As another example, the template for the query may be "GET [base]/ResourceType?_total=1000." Further, the assertion for the query may be "the returned resources cannot exceed 1000."

As another example, the conformance testing platform 130 may generate the query using the count modifier. In this case, the template for the query may be "GET [base]/ResourceType?_count=0." Further, the assertion for the query may be "no returned resources in the bundle." The template for the query may be "GET [base]/ResourceType?_count=1." Further, the assertion for the query may be "only one returned resource." As another example, the template for the query may be "GET [base]/ResourceType?_count=10." Further, the assertion for the query may be "no more than 10 resources are in the returned bundle."

As another example, the conformance testing platform 130 may generate the query using the summary modifier. In this case, the template for the query may be "GET [base]/ResourceType?_summary=count." Further, the assertion for the query may be "no returned resources in the bundle." The template for the query may be "GET [base]/ResourceType?_summary=text." Further, the assertion for the query may be "resources returned contain only text." The template for the query may be "GET [base]/ResourceType?_summary=data." Further, the assertion for the query may be "resources returned contain only coded values which are of type summary." The template for the query may be "GET [base]/ResourceType?_summary=true." Further, the assertion for the query may be "resources returned contains coded values which are of type summary." The template for the query may be "GET [base]/ResourceType?_summary=false." Further, the assertion for the query may be "resources returned are fully filled."

As another example, the conformance testing platform 130 may generate the query using the element modifier. In this case, the template for the query may be "GET [base]/ResourceType?_element=ELEMENT1,ELEMENT2,ELEMENT3." Further, the assertion for the query may be "returned resources contain only these elements, nothing else which is not mandatory."

As another example, the conformance testing platform 130 may generate the query using the include modifier. In this case, the template for the query may be "GET [base]/ResourceType?_include=ResourceType: param." Further, the assertion for the query may be "returned bundle contains the searched resource."

As another example, the conformance testing platform 130 may generate the query using the include modifier with *. In this case, the template for the query may be "GET [base]/ResourceType?_include=ResourceType: *." Further, the assertion for the query may be "returned bundle contains the searched resources."

As another example, the conformance testing platform 130 may generate the query using the revinclude modifier. In this case, the template for the query may be "GET [base]/ResourceType?_include=ResourceTypeParent: param." Further, the assertion for the query may be "returned bundle contains the searched resource."

As another example, the conformance testing platform 130 may generate the query using the revinclude modifier with *. In this case, the template for the query may be "GET [base]/ResourceType?_revinclude=*." Further, the assertion for the query may be "returned bundle contains the searched resources."

As another example, the conformance testing platform 130 may generate the query using the list search parameter. In this case, the template for the query may be "POST [base]/List (with link to the resource tested) GET [base]/ResourceType?_list=LIST_ID." Further, the assertion for the query may be "returned bundle contains the searched resource."

As another example, the conformance testing platform 130 may generate the query using the has search parameter. In this case, the template for the query may be "POST [base]/List (with link to the resource tested) GET [base]/ResourceType?_has=ReferenceResource.id=FZEFZE." Further, the assertion for the query may be "returned bundle contains the searched resource."

Figure 7:
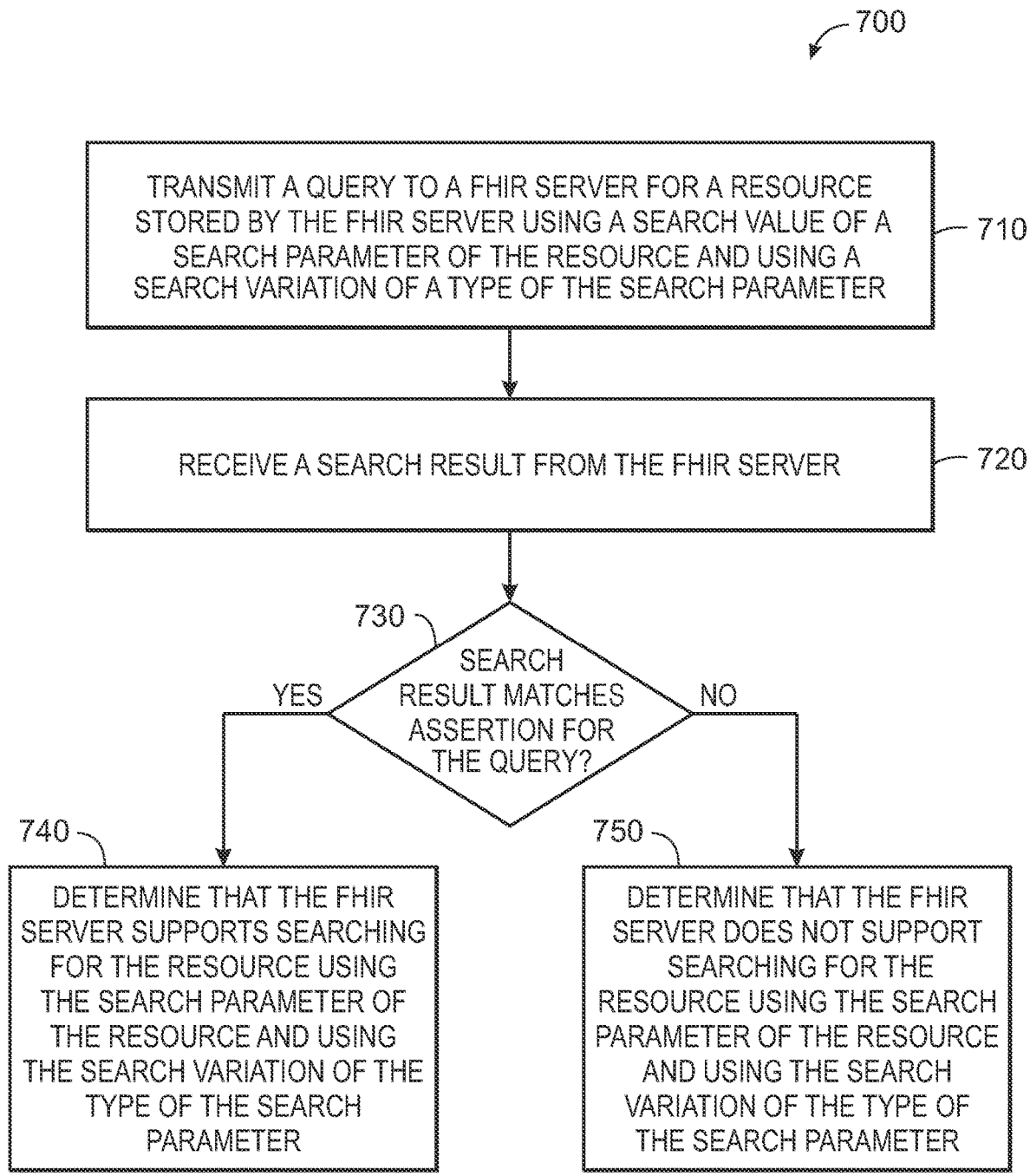
FIG. 7 is a flowchart of an example process for executing the test script in association with the FHIR server.

As further shown in FIG. 3, the process 300 may include executing the test script in association with the FHIR server (operation 330). For example, FIG. 7 is a flowchart of an example process 700 for executing the test script in association with the FHIR server. According to an embodiment, the conformance testing platform 130 may be configured to perform one or more operations of the process 700. As shown in FIG. 7, the conformance testing platform 130 may transmit a query to the FHIR server 120 for a resource stored by the FHIR server 120 using a search value of a search parameter of the resource and using a search variation of a type of the search parameter (operation 710). The FHIR server 120 may receive the query, search for a resource based on the query, and transmit a search result to the conformance testing platform 130. As further shown in FIG. 7, the process 700 may include receiving the search result from the FHIR server (operation 720), and determining whether the search result matches an assertion associated with the query (operation 730). If the search result matches the assertion associated with the query (operation 730—YES), then the process 700 may include determining that the FHIR server supports searching for the resource using the search parameter of the resource and using the search variation of the type of the search parameter (operation 740). If the search result does not match the assertion associated with the query (operation 730—NO), then the process 700 may include determining that the FHIR server does not support searching for the resource using the search parameter of the resource and using the search variation of the type of the search parameter (operation 750).

As further shown in FIG. 3, the process 300 may include generating a capability statement for the FHIR server based on executing the test script (operation 340). For example, the conformance testing platform 130 may generate a capability statement for the FHIR server 120 based on determining whether the FHIR server 120 supports searching for the resource using the search parameter of the resource and using the search variation of the type of the search parameter.

Figure 8:
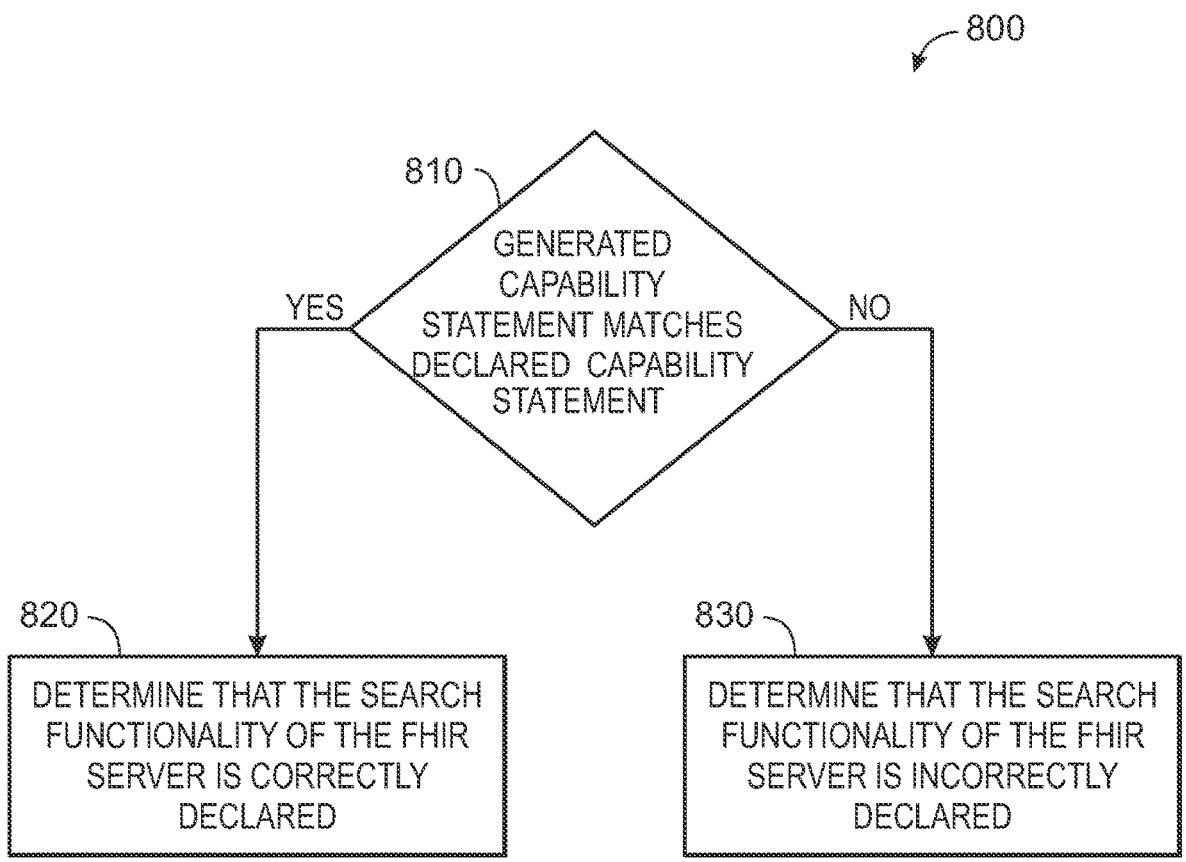
FIG. 8 is a flowchart of an example process for validating a declared capability statement of the FHIR server.

As further shown in FIG. 3, the process 300 may include validating a declared capability statement of the FHIR server based on the generated capability statement and the declared capability statement (operation 350). FIG. 8 is a flowchart of an example process 800 for validating a declared capability statement of the FHIR server. According to an embodiment, the conformance testing platform 130 may be configured to perform one or more operations of the process 800. As shown in FIG. 8, the process 800 may include determining whether the generated capability statement matches the declared capability statement (operation 810). If the generated capability statement matches the declared capability statement (operation 810—YES), then the process 800 may include determining that the search functionality of the FHIR server is correctly declared (operation 820). Alternatively, if the generated compatibility statement does not match the declared capability statement (operation 810—NO), then the process 800 may include determining that the search functionality of the FHIR server is incorrectly declared (operation 830).

As further shown in FIG. 3, the process 300 may include providing information related to a validation result of the declared capability statement for display based on validating the declared capability statement (operation 360).

According to an embodiment, the conformance testing platform 130 may provide, for display via the user device 150, information related to a validation result of the declared capability statement. For example, the information related to the validation result may identify search functionality that is correctly declared. As another example, the information related to the validation result may identify search functionality that is incorrectly declared. As another example, the information related to the validation result may identify the resources for which search is supported by the FHIR server 120, the search parameters for which search is supported by the FHIR server 120, and the variations of the types of search parameters for which search is supported by the FHIR server 120.

According to an embodiment, the conformance testing platform 130 may use the validation result to generate a declared capability statement. For example, the conformance testing platform 130 may generate a declared capability statement that accurately identifies search functionality of the FHIR server 120. The conformance testing platform 130 may provide the declared capability statement to the FHIR server 120 based on generating the declared capability statement.

According to an embodiment, the conformance testing platform 130 may use the validation result to perform a debugging process. For example, the conformance testing platform 130 may identify a source of error associated with search functionality of the FHIR server, and correct the source of error. Alternatively, the conformance testing platform 130 may provide information to the user device 150 that identifies the source of error.

According to an embodiment, the conformance testing platform 130 may use the validation result to generate code that permits the FHIR server 120 to implement particular search functionality. For example, the conformance testing platform 130 may identify search functionality that is not provided by the FHIR server 120, and generate code that permits the FHIR server 120 to implement the search functionality. The conformance testing platform 130 may provide the code to the FHIR server 120 to permit, or cause, the FHIR server 120 to implement the search functionality.

Figure 9:
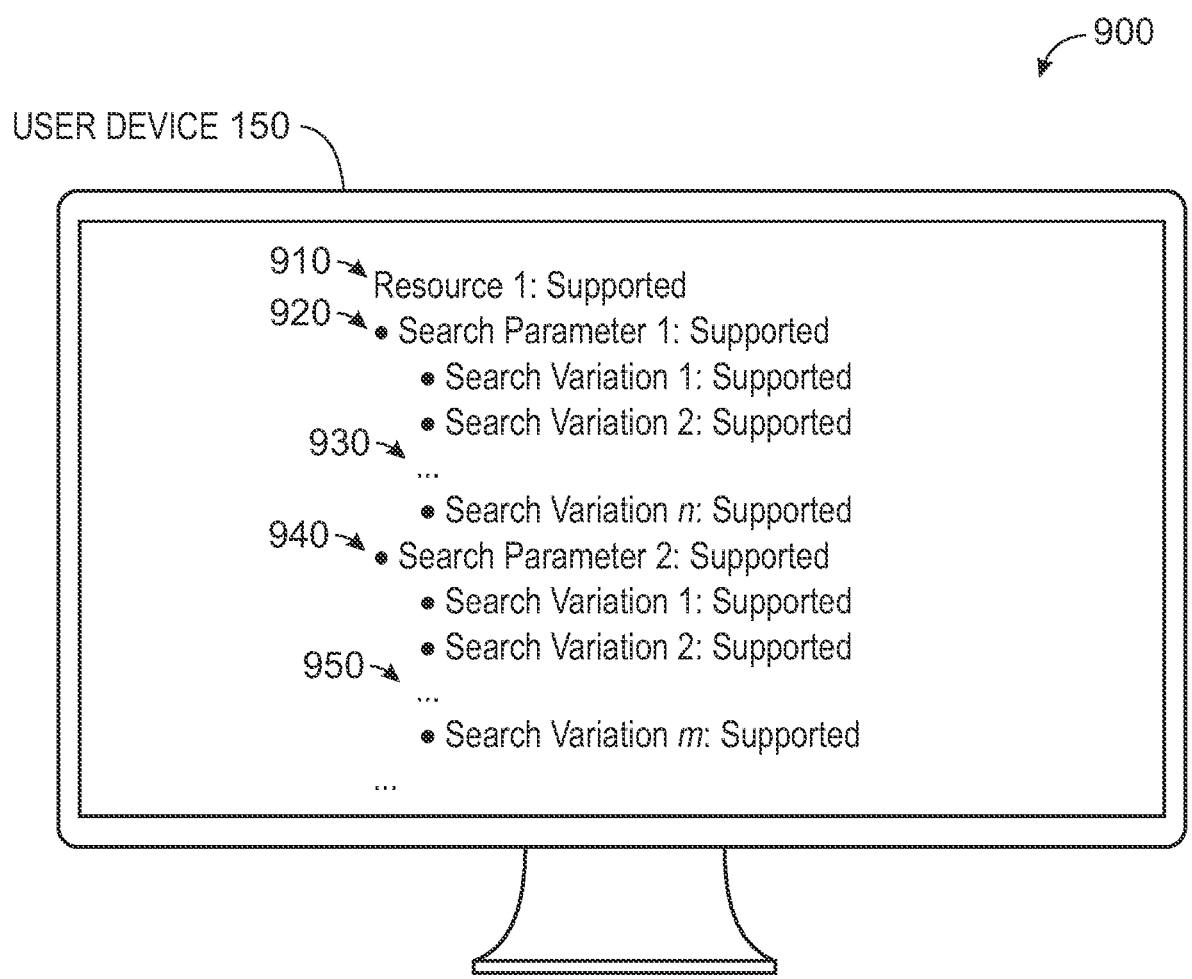
FIG. 9 is a diagram of an example user interface for displaying information related to a validation result of the declared capability statement.

FIG. 9 is a diagram of an example user interface 900 for displaying information related to a validation result of the declared capability statement. As shown in FIG. 9, the user device 150 may display the user interface 900. As shown by reference number 910, the user interface 900 may display information that identifies a first resource, and that identifies whether search functionality for the first resource is supported by the FHIR server 120. Further, as shown by reference number 920, the user interface 900 may display information that identifies a first search parameter of the first resource, and that identifies whether search functionality for the first search parameter is supported by the FHIR server 120. Further, as shown by reference number 930, the user interface 900 may display information that identifies search variations of the first search parameter, and that identifies whether search functionality for the search variations is supported by the FHIR server 120.

As shown by reference number 940, the user interface 900 may display information a second search parameter of the first resource, and that identifies whether search functionality for the second search parameter is supported by the FHIR server 120. Further, as shown by reference number 950, the user interface 900 may display information that identifies search variations of the second search parameter, and that identifies whether search functionality for the search variations is supported by the FHIR server 120.

Figure 10:
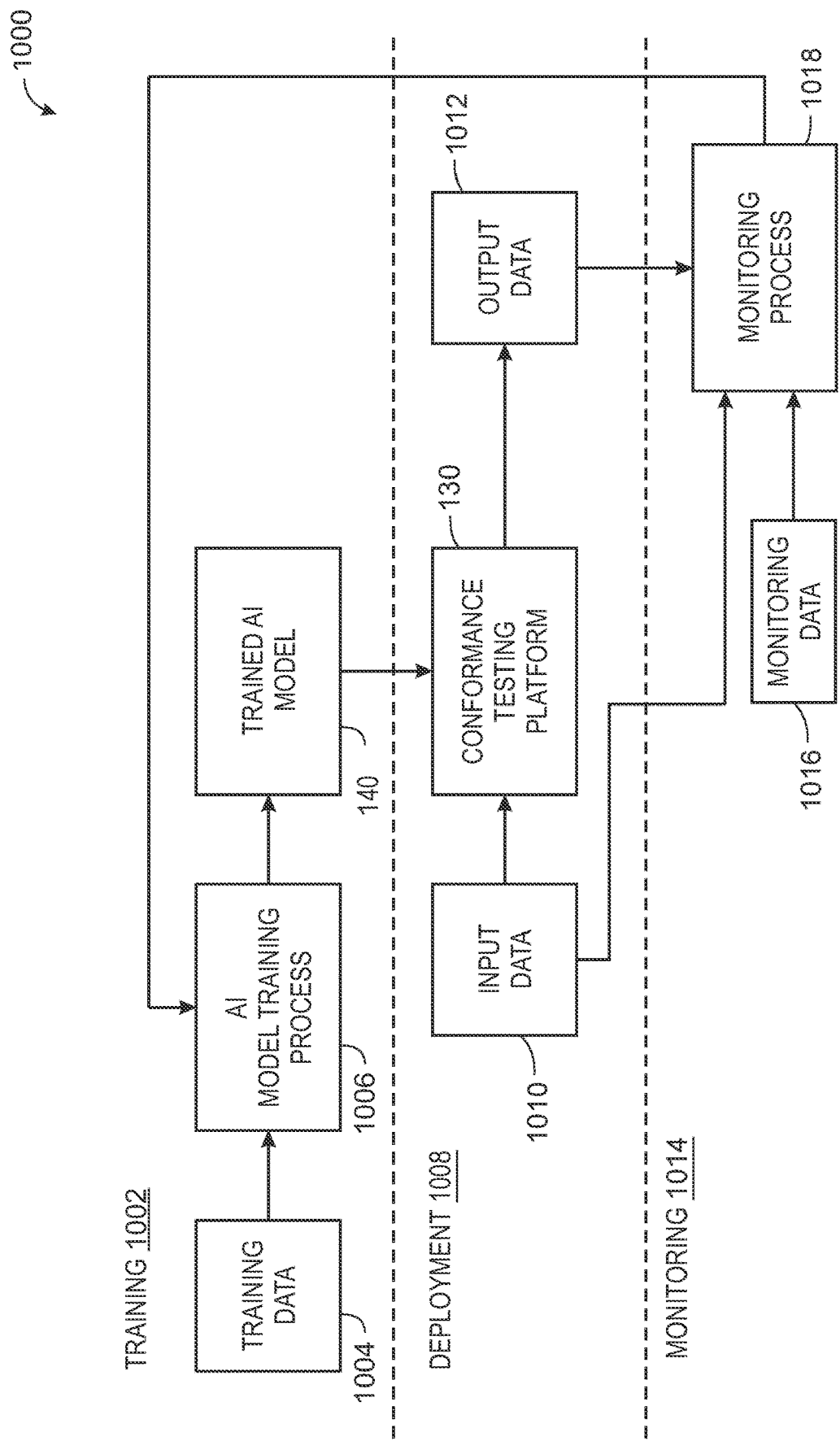
FIG. 10 is a diagram of an example process for training an artificial intelligence (AI) model.

FIG. 10 is a diagram of an example process 1000 for training an artificial intelligence (AI) model. The conformance testing platform 130 may generate, store, train, and/or use the AI model 140. According to an embodiment, the conformance testing platform 130 may include the AI model 140 and/or instructions associated with the AI model 140. For example, the conformance testing platform 130 may include instructions for generating the AI model 140, training the AI model 140, using the AI model 140, etc. According to another embodiment, a system or device other than the conformance testing platform 130 may be used to generate and/or train the AI model 140. For example, a system or device may include instructions for generating the AI model 140, and/or instructions for training the AI model 140. The system or device may provide a resulting trained AI model 140 to the conformance testing platform 130 for use.

As shown in FIG. 10, according to an embodiment, the process 1000 may include a training phase 1002, a deployment phase 1008, and a monitoring phase 1014. In the training phase 1002, at operation 1006, the process 1000 may include receiving and processing training data 1004 to generate a trained AI model 140 for performing one or more operations of any one of the processes 300-800. The training data 1004 may include information related to the FHIR standard, information related to a test script, information related to a capability statement, information related to a resource, information related to a search parameter, information related to a search variation of a type of a search parameter, information associated with a query, information associated with an assertion, or the like.

Generally, the AI model 140 may include a set of variables (e.g., nodes, neurons, filters, or the like) that are tuned (e.g., weighted, biased, or the like) to different values via the application of the training data 1004. According to an embodiment, the training process at operation 1006 may employ supervised, unsupervised, semi-supervised, and/or reinforcement learning processes to train the AI model 140. According to an embodiment, a portion of the training data 1004 may be withheld during training and/or used to validate the trained AI model 140.

For supervised learning processes, the training data 1004 may include labels or scores that may facilitate the training process by providing a ground truth. The AI model 140 may have variables set at initialized values (e.g., at random, based on Gaussian noise, based on pre-trained values, or the like). The AI model 140 may provide an output, and the output may be compared with the corresponding label or score (e.g., the ground truth), which may then be back-propagated through the AI model 140 to adjust the values of the variables. This process may be repeated for a plurality of samples at least until a determined loss or error is below a predefined threshold. According to an embodiment, some of the training data 1004 may be withheld and used to further validate or test the trained AI model 140.

For unsupervised learning processes, the training data 1004 may not include pre-assigned labels or scores to aid the learning process. Instead, unsupervised learning processes may include clustering, classification, or the like, to identify naturally occurring patterns in the training data 1004. As an example, the training data 1004 may be clustered into groups based on identified similarities and/or patterns. K-means clustering or K-Nearest Neighbors may also be used, which may be supervised or unsupervised. Combinations of K-Nearest Neighbors and an unsupervised cluster technique may also be used. For semi-supervised learning, a combination of training data 1004 with pre-assigned labels or scores and training data 1004 without pre-assigned labels or scores may be used to train the AI model 140.

When reinforcement learning is employed, an agent (e.g., an algorithm) may be trained to make a decision regarding the data quality from the training data 1004 through trial and error. For example, based on making a decision, the agent may then receive feedback (e.g., a positive reward if the prediction was above a predetermined threshold), adjust its next decision to maximize the reward, and repeat until a loss function is optimized.

After being trained, the trained AI model 140 may be stored and subsequently applied by the conformance testing platform 130 during the deployment phase 1008. For example, during the deployment phase 1008, the trained AI model 140 executed by the conformance testing platform 130 may receive input data 1010 for performing one or more operations of any one of processes 300-800.

After being applied by the conformance testing platform 130 during the deployment phase 1008, the trained AI model 140 may be monitored during the monitoring phase 1014. The monitoring data 1016 may include data that is output by the AI model 140. During the monitoring process 1018, the monitoring data 1016 may be analyzed along with the predicted output data 1012 and input data 1010 to determine an accuracy of the trained AI model 140. According to an embodiment, based on the analysis, the process 1000 may return to the training phase 1002, where at operation 1006 values of one or more variables of the model may be adjusted to improve the accuracy of the AI model 140.

The example process 1000 described above is provided merely as an example, and may include additional, fewer, different, or differently arranged aspects than depicted in FIG. 10.

Embodiments of the present disclosure shown in the drawings and described above are example embodiments only and are not intended to limit the scope of the appended claims, including any equivalents as included within the scope of the claims. Various modifications are possible and will be readily apparent to the skilled person in the art. It is intended that any combination of non-mutually exclusive features described herein are within the scope of the present invention. That is, features of the described embodiments can be combined with any appropriate aspect described above and optional features of any one aspect can be combined with any other appropriate aspect. Similarly, features set forth in dependent claims can be combined with non-mutually exclusive features of other dependent claims, particularly where the dependent claims depend on the same independent claim. Single claim dependencies may have been used as practice in some jurisdictions require them, but this should not be taken to mean that the features in the dependent claims are mutually exclusive.

What is claimed is:

1. A method for conformance testing of a Fast Healthcare Interoperability Resources (FHIR) server, the method comprising:
   receiving, by one or more processors, information related to a FHIR standard;
   determining, by the one or more processors, resources defined by the FHIR standard, search parameters of the resources, and search variations of the search parameters of the resources by analyzing the information related to the FHIR standard;
   generating, by the one or more processors, a test script, including a query for a resource stored by the FHIR server using a search value of a search parameter of the resource and using a search variation of a type of the search parameter, based on determining the resources defined by the FHIR standard, the search parameters of the resources, and the search variations of the search parameters of the resources;
   executing, by the one or more processors, the test script in association with the FHIR server;
   generating, by the one or more processors, a capability statement for the FHIR server based on executing the test script;
   validating, by the one or more processors and using an artificial intelligence (AI) model, a declared capability statement of the FHIR server based on the generated capability statement and the declared capability statement; and
   displaying, by the one or more processors, a validation result based on validating the declared capability statement of the FHIR server,
   wherein the AI model is trained to receive the declared capability statement and the generated capability statement as inputs, and generate the validation result as an output based on the inputs.

2. The method of claim 1, further comprising:
   determining, by the one or more processors, the resource, the search parameter of the resource, and the search variation of the type of the search parameter for which to generate the query based on the declared capability statement of the FHIR server.

3. The method of claim 1, further comprising:
   determining, by the one or more processors, the resource, the search parameter of the resource, and the search variation of the type of the search parameter for which to generate the query based on predetermined information that identifies the resource, the search parameter of the resource, and the search variation of the type of the search parameter for which to generate the query.

4. The method of claim 1, further comprising:
   determining, by the one or more processors, that the FHIR server supports a POST operation;
   sending, by the one or more processors, the resource to the FHIR server for storage by the FHIR server; and
   determining, by the one or more processors, the search value based on sending the resource to the FHIR server.

5. The method of claim 1, further comprising:
   determining, by the one or more processors, that the FHIR server does not support a POST operation;

requesting, by the one or more processors, the resource from the FHIR server; and determining, by the one or more processors, the search value based on requesting the resource from the FHIR server.

6. The method of claim 1, wherein executing the test script in association with the FHIR server comprises:

transmitting, by the one or more processors, the query to the FHIR server;

receiving, by the one or more processors, a search result from the FHIR server based on the query;

determining, by the one or more processors, whether the search result matches an assertion associated with the query; and determining, by the one or more processors, whether the FHIR server supports searching for the resource using the search parameter of the resource and using the search variation of the type of the search parameter.

7. The method of claim 1, wherein validating the declared capability statement of the FHIR server based on the generated capability statement and the declared capability statement comprises:

determining, by the one or more processors, whether the declared capability statement matches the generated capability statement; and determining, by the one or more processors, whether search functionality of the declared capability statement is correctly declared based on determining whether the declared capability statement matches the generated capability statement.

8. A method for conformance testing of a Fast Healthcare Interoperability Resources (FHIR) server, the method comprising:

determining, by one or more processors, resources defined by a FHIR standard, search parameters of the resources, and search variations of the search parameters of the resources by analyzing information related to the FHIR standard;

generating, by the one or more processors, a test script, including a query for a resource stored by the FHIR server using a search value of a search parameter of the resource and using a search variation of a type of the search parameter based on determining the resources defined by the FHIR standard, the search parameters of the resources, and the search variations of the search parameters of the resources;

executing, by the one or more processors, the test script in association with the FHIR server;

generating, by the one or more processors, a capability statement for the FHIR server based on executing the test script;

validating, by the one or more processors and using an artificial intelligence (AI) model, a declared capability statement of the FHIR server based on the generated capability statement and the declared capability statement; and displaying, by the one or more processors, a validation result based on validating the declared capability statement of the FHIR server, wherein the AI model is trained to receive the declared capability statement and the generated capability statement as inputs, and generate the validation result as an output based on the inputs.

9. The method of claim 8, further comprising:

determining, by the one or more processors, the resource, the search parameter of the resource, and the search variation of the type of the search parameter for which to generate the query based on the declared capability statement of the FHIR server.

10. The method of claim 8, further comprising:

determining, by the one or more processors, the resource, the search parameter of the resource, and the search variation of the type of the search parameter for which to generate the query based on predetermined information that identifies the resource, the search parameter of the resource, and the search variation of the type of the search parameter for which to generate the query.

11. The method of claim 8, further comprising:

determining, by the one or more processors, that the FHIR server supports a POST operation;

sending, by the one or more processors, the resource to the FHIR server for storage by the FHIR server; and determining, by the one or more processors, the search value based on sending the resource to the FHIR server.

12. The method of claim 8, further comprising:

determining, by the one or more processors, that the FHIR server does not support a POST operation;

requesting, by the one or more processors, the resource from the FHIR server; and determining, by the one or more processors, the search value based on requesting the resource from the FHIR server.

13. The method of claim 8, wherein executing the test script in association with the FHIR server comprises:

transmitting, by the one or more processors, the query to the FHIR server;

receiving, by the one or more processors, a search result from the FHIR server based on the query;

determining, by the one or more processors, whether the search result matches an assertion associated with the query; and determining, by the one or more processors, whether the FHIR server supports searching for the resource using the search parameter of the resource and using the search variation of the type of the search parameter.

14. The method of claim 8, wherein validating the declared capability statement of the FHIR server based on the generated capability statement and the declared capability statement comprises:

determining, by the one or more processors, whether the declared capability statement matches the generated capability statement; and determining, by the one or more processors, whether search functionality of the declared capability statement is correctly declared based on determining whether the declared capability statement matches the generated capability statement.

15. A device comprising:

a memory configured to store instructions; and one or more processors configured to execute the instructions to:

determine resources defined by a Fast Healthcare Interoperability Resources (FHIR) standard, search parameters of the resources, and search variations of the search parameters of the resources by analyzing information related to the FHIR standard;

generate a query for a resource stored by a FHIR server using a search value of a search parameter of the resource and using a search variation of a type of the search parameter based on determining the resources defined by the FHIR standard, the search parameters of the resources, and the search variations of the search parameters of the resources;

transmit the query to the FHIR server;

generate a capability statement for the FHIR server based on a response from the FHIR server to the query;

validate, using an artificial intelligence (AI) model, a declared capability statement of the FHIR server based on the generated capability statement and the declared capability statement; and display a validation result based on validating the declared capability statement of the FHIR server, wherein the AI model is trained to receive the declared capability statement and the generated capability statement as inputs, and generate the validation result as an output based on the inputs.

16. The device of claim 15, wherein the one or more processors are further configured to:

determine the resource, the search parameter of the resource, and the search variation of the type of the search parameter for which to generate the query based on the declared capability statement of the FHIR server.

17. The device of claim 15, wherein the one or more processors are further configured to:

determine the resource, the search parameter of the resource, and the search variation of the type of the search parameter for which to generate the query based on predetermined information that identifies the resource, the search parameter of the resource, and the search variation of the type of the search parameter for which to generate the query.

18. The device of claim 15, wherein the one or more processors are further configured to:

determine that the FHIR server supports a POST operation;

send the resource to the FHIR server for storage by the FHIR server; and determine the search value based on sending the resource to the FHIR server.

19. The device of claim 15, wherein the one or more processors are further configured to:

determine that the FHIR server does not support a POST operation;

request the resource from the FHIR server; and determine the search value based on requesting the resource from the FHIR server.

* * * * *